(12) United States Patent
  Almog

(10) Patent No.: US 7,984,163 B2
(45) Date of Patent: Jul. 19, 2011

(54) METHOD AND SYSTEM FOR OPTIMIZING DNS QUERIES

(75) Inventor: Guy Almog, Herzelia (IL)

(73) Assignee: Flash Networks, Inc., Herzliya (IL)

( * ) Notice: Subject to any disclaimer, the term of this patent is extended or adjusted under 35 U.S.C. 154(b) by 588 days.

(21) Appl. No.: 11/813,001

(22) PCT Filed: Jan. 11, 2006

(86) PCT No.: PCT/IL2006/000043
§ 371 (c)(1),
(2), (4) Date: Jun. 28, 2007

(87) PCT Pub. No.: WO2006/075323
PCT Pub. Date: Jul. 20, 2006

(65) Prior Publication Data
US 2008/0140847 A1   Jun. 12, 2008

Related U.S. Application Data

(60) Provisional application No. 60/643,477, filed on Jan. 13, 2005.

(51) Int. Cl.
  *G06F 15/16* (2006.01)
  *G06F 15/173* (2006.01)
  *H04L 12/54* (2006.01)
  *H04L 12/56* (2006.01)
  *H04L 12/50* (2006.01)

(52) U.S. Cl. ........ 709/228; 709/238; 709/229; 370/400; 370/389; 370/386

(58) Field of Classification Search .................. 709/228, 709/229, 238; 370/400, 389, 386
See application file for complete search history.

(56) References Cited

U.S. PATENT DOCUMENTS
6,016,512 A * 1/2000 Huitema ........................ 709/245
6,421,732 B1 * 7/2002 Alkhatib et al. ............... 709/245
(Continued)

FOREIGN PATENT DOCUMENTS
WO  WO00-27092 A1  5/2000
WO  WO03-009546 A1  1/2003

OTHER PUBLICATIONS
Efi Gatmor, Accelerating DNS Traffic in the Enterprise, Jun. 20, 2005, Expand networks, White Paper.*
(Continued)

*Primary Examiner* — Carl Colin
*Assistant Examiner* — Peter Shaw
(74) *Attorney, Agent, or Firm* — Smith Risley Tempel Santos LLC; Gregory Scott Smith; Matthew T. Hoots

(57) ABSTRACT

Traffic transmitted over long fat networks (LFN) can be expensive and/or slow. The amount of traffic is reduced by application of the present invention which introduces a manipulator device at each end of a long fat network. The manipulator device emulates the opposing end-side equipment for the local-side equipment and then communications over the long fat network using an established tunnel. Thus, the protocol exchanges that would normally be transmitted over the long fat network in setting up, tearing down and controlling a communications session are reduced or eliminated. Yet an alternate embodiment may use a single manipulator device at a central operator premises of the LFN. The single manipulator device may replace domain names that are embedded within a markup language file with their IP addresses.

13 Claims, 11 Drawing Sheets

U.S. PATENT DOCUMENTS

| | | |
|---|---|---|
| 6,442,602 B1 | 8/2002 | Choudhry |
| 6,526,450 B1 | 2/2003 | Zhang |
| 6,732,314 B1 | 5/2004 | Borella et al. |
| 7,194,546 B2 * | 3/2007 | Kameoka et al. ............. 709/229 |
| 7,266,124 B2 * | 9/2007 | Kim et al. .................... 370/397 |
| 2002/0007413 A1 * | 1/2002 | Garcia-Luna-Aceves et al. ................. 709/229 |
| 2003/0214955 A1 * | 11/2003 | Kim .............................. 370/400 |
| 2003/0233478 A1 | 12/2003 | Chuah et al. |
| 2004/0215823 A1 | 10/2004 | Kleinfelter et al. |
| 2005/0066041 A1 * | 3/2005 | Chin et al. .................... 709/228 |
| 2005/0235044 A1 | 10/2005 | Tazuma |

OTHER PUBLICATIONS

Krishanamurthy, DEW:DNS-Enhanced Web for Faster Content Delivery, May 24, 2003, ACM, 1-58113-680-3/03/0005, 310.*

* cited by examiner

Remote Client

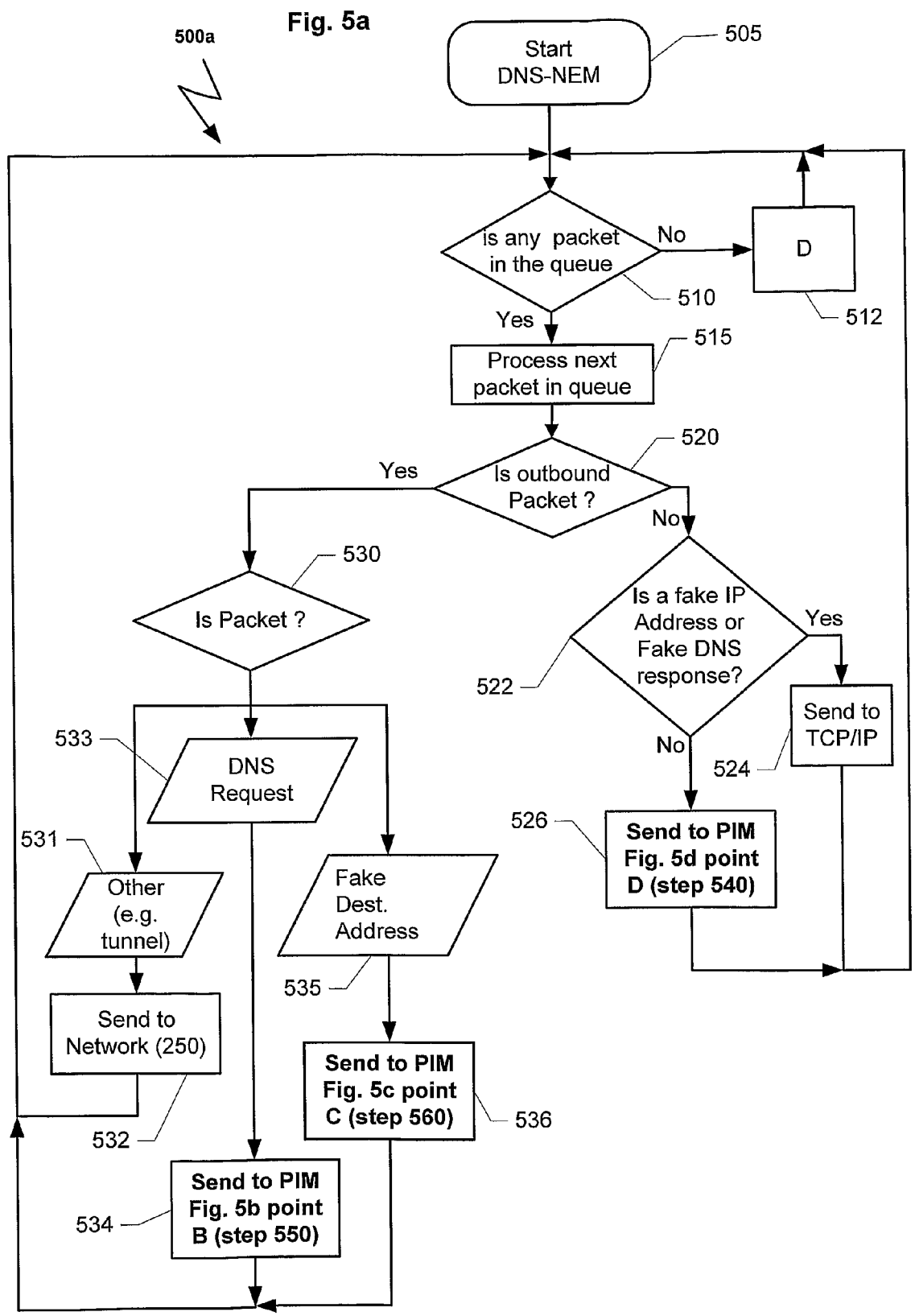

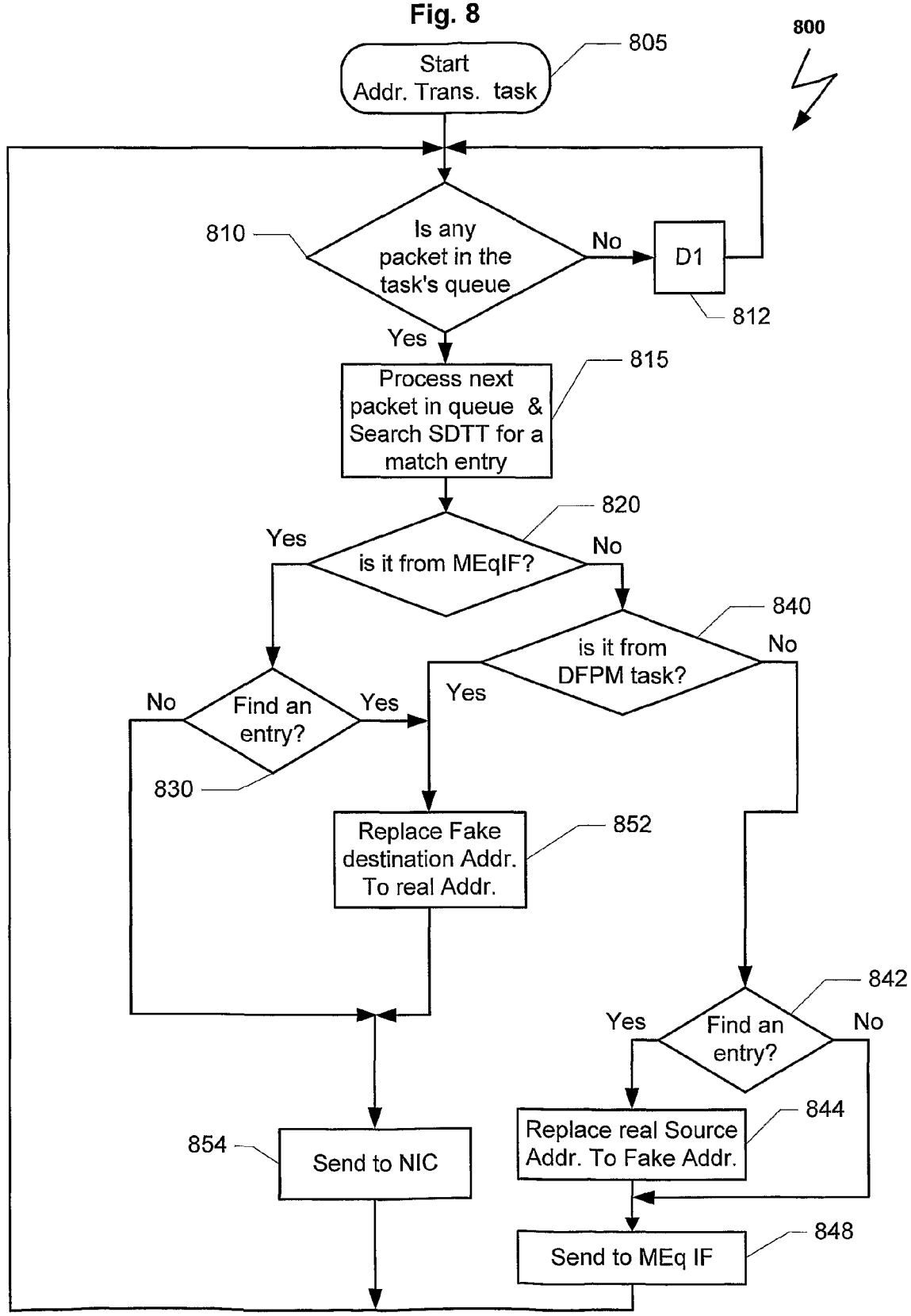

METHOD AND SYSTEM FOR OPTIMIZING DNS QUERIES

CROSS-REFERENCE TO RELATED APPLICATIONS

This application is filed under 37 U.S.C. 371 and is based on International Patent Number PCT/IL2006/000043 entitled "METHOD AND SYSTEM FOR OPTIMIZING DNS QUERIES" which was filed on Jan. 11, 2006, which application claims the benefit of the filing date and priority of United States Provisional Application for Patent having been assigned the Ser. No. of 60/643,477 and filed on Jan. 13, 2005 naming Guy Almog as the inventor, which application is herein incorporated by reference.

BACKGROUND OF THE INVENTION

The present invention relates to data communication field and, more particularly, to a system and method for optimizing "domain name servers" ("DNS") traffic during the process of establishing a communication session over the Internet.

The most popular forum for world-wide data communication linking together computers all on a global basis is the Internet. The Internet is a hierarchy of many computer networks, all of which are interconnected by various types of server computers. One to the key aspects that led to the success of the Internet is the addressing scheme that is employed. The addressing scheme uses two types of addressing methods.

The first addressing method, referred to as the Internet Protocol ("IP") address, is a numeric address value consisting of four or more (depending on the IP version IPV4 or IPV6) binary octets separated by a period or "dot", such as AA.BB.CC.DD. The values towards the left of the address, such as AA and BB, are referred to as network addresses and are used for coarse resolution of the address, while the values towards the right of the address are used for fine resolution of the address, such as CC and DD. The numeric method suits computers very well; however, it can be difficult for human users to remember a long string of numbers.

To make the Internet more "user-friendly", a second addressing method is used. The second method is a text-based addressing method that is "overlaid" on top of the numeric IP addressing method. Thus, a hierarchy of text-based addresses was defined. At the top of the hierarchy is a domain, which in general is a large range of IP addresses or a group of IP addresses. The right-side domain server may be assigned an easy to remember domain name such as "flashnetworks.com". Under the Internet domain name convention, the extension of the name following the period or "dot" helps to categorize the type of domain. In this example, "com" refers to the commercial uses domain. Coupled with the domain name, "flashnetworks", a particular domain server is addressed.

However, it should be understood that the text-based addressing method or domain name is used only as a human interface. To establish the connection to a computer using such a domain name, a translation to a numeric IP address must be made. The translation is accomplished by a number of distributed "domain name servers" ("DNS"), which can be queried to provide the translation. Each domain name server maintains records regarding IP-to-domain name assignments for the domains which it serves. This translation technique and the protocol for updating records is described in the Internet Request For Comment ("RFC") papers, which are public documents and are well known in the art.

In some situations, a service provider may want to accelerate the Internet connection between the central premises of the service provider and a remote client. For example, this is certainly the case when the Internet connection runs over long delay connections or an expensive connection Long Fat Network (LFN) such as satellite connection, fiber cable services, cellular etc. In an effort to improve the services, the service provider or an operator may want to add Manipulation Equipment (MEq) in both sides of a long delay connection or the expensive connection—in the user equipment and in the central operator premises. In an alternate exemplary embodiment of the present invention a Manipulation Equipment (MEq) is added in one side of the LFN, usually at the central operator premises. The MEq accelerates the transportation between the user equipment and the MEq server over the IP (Internet Protocol) connection. The connection may include but is not limited to long delay connection, cellular, wireless, etc. Common MEq may operate and manipulate common IP protocols such as, but not limited to, TCP/IP modules etc. TCP/IP stands for Transmission Control Protocol/Internet Protocol. TCP provides transport functions, which ensure that the total amount of bytes sent is received correctly at the other end. UDP is part of the TCP/IP module, but is an alternate transport that does not guarantee delivery. UDP is widely used for real time voice and video transmissions where erroneous packets are not retransmitted.

Henceforth, the description of exemplary embodiments of the present invention may use the term LFN as a representative term for the communication path between a user and the MEq server at the service provider premises—the central operator premises. The communication path may include, but is not limited to, cellular, satellite, fiber optics cable, wireless, etc. The LFN may be a combination of two or more types of physical connection paths.

The MEq client may operate to interrupt the communication between a user equipment and its final destination over the LFN, and then perform some manipulation on the data before transmitting the data over the LFN. On the other side of the LFN, an MEq server is installed and performs the inverse operation of the first MEq. An exemplary MEq may operate to improve the speed of the communication and reduce the volume of data over the LFN lines. An alternate MEq may impersonate and respond in the name of the other side of the connection to increase the speed of the communication. For example, if an original connection is based on TCP/IP, then the MEq may respond and send an acknowledge packet to the sending system instead of the receiving system on the other side of the connection. An MEq may manipulate the data in internal layers, such as: the Transport layer (TCP), in the application layer (HTTP, MAPI etc.) and in the content (HTML, gif etc.). Within the context of this description, the terms manipulation, optimization and acceleration may be used interchangeably and at times, may have the same meaning.

Internet communication, which is based on protocols such as, but not limited to, HTTP, SMTP, POP3, HTML and etc., may require a plurality of DNS queries during a single communication between a client and a service provider. Each DNS query has its RTT (Round Trip Time) latency, which is reflected to the user. Furthermore, observations on the transportation over the Internet disclose that the DNS transportation has 10% of the share of the total transportation over the Internet.

There are some caching methods that are used in order to accelerate the DNS request cycle. However the DNS addresses in the caching systems may not be updated. Furthermore, the caching methods require at least one DNS cycle per caching period.

Therefore there is a need in the art for a system and a method for accelerating and improving the DNS cycle. Such a system may improve the response of the system to a user's request as well as reducing the load over the network.

BRIEF SUMMARY OF THE DESCRIPTION

Exemplary embodiments of the present invention solve the above-described needs in the art by providing a system and a method that eliminates the DNS queries transportation over the LFN that occur between a user equipment of an MEq and a server of the MEq.

In general, the present invention, aspects and features of the present invention, operate to optimize network communication that occurs over expense mediums, and or slow medium, such as long fat networks. In one exemplary embodiment of the present invention communications between two points over a long fat network is reduced by placing a manipulator device on each side of the long fat network. The manipulator devices on opposing ends of the long fat network operate as door to a communications conduit for data between devices communicating over the long fat network. The manipulator devices establish a communications tunnel over the long fat network. As communications are received, the manipulator devices emulate the destination from the perspective of the originator and then forward the communications over the tunnel for further delivery to the destination in a manner that reduces the amount of traffic occurring over the long fat network.

More specifically, when a first communication directed towards a destination reachable through the long fat network is received from an end user device, the initiating side manipulator device intercepts the communication. If the communication is the initiation of a session, then the initiating side manipulator emulates the DNS server for the destination and engages the end user device in the necessary protocol steps in setting up the communication.

The initiating side manipulator then provides information to the terminating side manipulator over the communications tunnel that identifies the source of the communication, the destination of the communication and a fake or locally used IP address that will be used for transferring future communications between the end user device and the destination for a present session.

An exemplary embodiment of the present invention which can be installed within a user's system, may route IP packets that are transferred to or from the link layer to a plug-in module (PIM) and from there to the MEq client or to the LFN. Routing the packets may be done by one or more network extender modules (NEM) that may be installed in-between the transportation layer (TCP/IP protocol stack) and the physical network adapter (the network driver). For example, in the "WINDOWS" operating system, this layer is called the NDIS. Other exemplary embodiments may use an intermediate driver as a layer in-between the TCP/IP layer and the link layer. The intermediate driver may have the functionality of the NEM and the PIM. Other exemplary embodiments may use a product such as a Deterministic Network Extender (DNE) delivered by Deterministic Network from Santa Cruz, Ca. USA to route the packets to the PIM. Other exemplary embodiments of the present invention may place the NEM in-between an application socket API (Application Program Interface) and the transport layer. For example, in the "WINDOWS" operating system, this layer is called the Transport Data Interface (TDI) layer. Exemplary embodiments of the present invention may select which type of IP packets will be redirected by the NEM. An exemplary embodiment of the present invention may configure the NEM to redirect only TCP packets, other embodiments may request to redirect the transportation of TCP packets as well as UDP packets, and yet other embodiments may redirect all IP transportation, etc.

The plug-in module (PIM) may be configured to identify DNS request packets and then operate to manipulate them. The action of identifying the DNS packets may be based on examining the type and port number of the DNS packets. As an example, a DNS request is a UDP packet that includes a destination port number 53. Upon receiving a DNS request packet, the PIM may respond by sending a DNS reply with a fake IP address to the source of the request. Sending the response may be done via the NEM. A DNS request may be issued by any application that communicates over the Internet, including but not limited to, a browser, an electronic mail application, ICMP (Internet control messaging protocol) etc. Exemplary fake IP addresses may be 10.10.10.10; 10.10.10.20; 10.10.1.3 etc. Replacing the real IP address with the fake IP address and vice versa requires additional processing of the packet. For example, a new checksum calculation in accordance with the communication protocol must be performed so that the checksum is based on a packet that includes the fake IP address.

Fake IP addresses may also be selected from the private addresses space. For example, RFC 1918 defines the following addresses as private IP addresses: 172.16.0.0 to 172.31.255.255; 192.168.0.0 to 192.168.255.255; etc. Some embodiments of the present invention may enable an administrator to define certain private addresses that are not used as the fake IP addresses.

The PIM may create a Client DNS translation table (CDTT) and save the fake IP address and the name of the domain in an entry in the CDTT. The entry will be associated with the connection to the certain domain. The client DNS translation table may be used to maintain the connection and to translate the fake address to the real one and vice versa.

Upon receiving the fake IP address, the application that initiated the DNS request may start sending packets to the destination fake IP address. The first data packet may be routed by the NEM to the PIM. Then the first data packet is identified by the PIM. The PIM may be configured to retrieve the appropriate domain name from the client DNS translation table and associate it with the first data packet. An association of the first packet and the domain name may be done by adding the domain name as a piggyback over the first packet. Adding the domain name to the piggyback is done in accordance with the applicable protocols. For example, the checksum bits may need to be recalculated. Alternatively, the domain name may be sent as a special message instead of as a piggyback message. In this alternate case, the domain name may be sent in a prior packet informing the receiver about the fake domain IP address packet that is coming. The association of the first packet with the domain name is transferred to the MEq client (MEqC) application in the remote computer. It should be noted that the terms "piggyback", "special message" and "prior packet" are used interchangeably herein. Henceforth, the description of the present invention may use the term "piggyback" as a representative term for any of the above group.

In an alternate embodiment of the present invention, if the type of the communication being employed cannot be manipulated by the MEq, then the association of the first packet with the domain name may be sent by the PIM directly to the link layer without traveling through the MEqC. Sending the association may be done via a tunnel (a DNS tunnel) that can be set between the PIM and an appropriate module in the MEq server (MEqS). The appropriate module may be a filter module or the DNS task (module). In another embodiment, the association may be sent from the PIM to the filter embedded within a packet that has a destination of the filter. The packet that carries the association can be a UDP/IP packet, for example.

In general the MEqC establishes a tunnel between the MEqC and the MEq server (MEqS) over the LFN. The MEqC may send the association of the first packet with the domain name over the tunnel to the MEqS. The MEqS may be configured to respond to the association of the first packet with the domain name by initiating a server DNS task. The server DNS task may save the domain name, which is written in the piggyback, and the fake IP address in an entry in a server DNS translation table (SDTT). The entry in the SDTT may also include the source IP address, the source IP port, the destination IP address and port and an ID number of the tunnel.

Subsequently, the server DNS task may initiate a DNS request for the domain name and send the request to an associated DNS server. Usually, the associated DNS server is located in the same LAN as the MEqS and operates in the premises of the service provider. The associated DNS server retrieves the real IP address and replies to the MNqS. At the MEqS, the server DNS task searches the appropriate entry in the server DNS translation table and adds the real domain IP address to the table.

After receiving the real domain IP address, the server DNS task in the MEqS retrieves the first packet and determines whether it may be manipulated by the MEq. If the first packet can be manipulated, the first packet having the fake IP address is transferred to the MEqS for further processing. If the first packet cannot be manipulated, then the fake destination IP address of the first packet is replaced with the real IP address and the first packet with the real IP address is sent to the Internet to establish a connection between the user equipment and the domain.

Upon receiving a response to a first packet of a connection (wherein the first packet that cannot be manipulated by the MEq), the DNS task may replace the real IP address of the domain in the first packet with the fake IP address; create an association of the real IP address and the first response and send the association to the PIM in the remote client. Sending the association may be done in a tunnel packet (a DNS tunnel packet) that is sent between the PIM and the DNS task (module) or in a packet, such as but not limited to, a UDP packet with a port number that represent the DNS and the first packet module in the MEqS. The association of the first packet and the real domain IP address may be done by adding the real domain IP address as a piggyback over the first packet. Adding the real domain IP address to the piggyback is done according to the protocols. For example the checksum bits are recalculated. Alternatively, the real domain IP address may be sent as a special message instead of a piggyback. In this alternate case, the real domain IP address may be sent in a prior packet informing the PIM about the fake domain IP address packet that is coming. It should be noted that the terms "piggyback", "special message" and "prior packet" are used interchangeably herein. Henceforth, the description of the present invention may use the term "piggyback" as a representative term for any of the above group In the user equipment, the response to the association of first packet with real domain IP address is transferred to the PIM. The PIM may retrieve the real domain IP address from the piggyback message and save it in the DNS translation table in the same entry with the domain name and the fake IP address. Then the response to the 1st packet having the fake address, without the piggyback is transferred to the application that initiated the connection.

After receiving the response with the fake IP address, the source application continues the communication session using the fake IP address for the entire session. The destination address of the outbound packets is the fake IP address and the source address of the inbound packet likewise has to be the fake IP address. During the communication session, packets from the application that cannot be manipulated by the MEqC are routed by the NEM to the PIM. Packets that can be manipulated are transferred with the fake destination IP address to the MEqC. Transferring the packets to the MEqC may be done via a shared memory or via an NEM.

The fake destination IP address of the outbound packets that cannot be manipulated by the MEqC is replaced by the PIM with the real destination address and the packet with the real destination address is returned to the NEM. From the NEM, the packet with the real destination is then sent to the Internet via the link layer. The PIM may add a direction bit (inbound or outbound) to the packet before returning it to the NEM. Furthermore the PIM processes the packet with the real domain IP address in accordance with the protocol requirements, including the recalculation of the appropriate checksum bits of the packet.

Ongoing inbound packets coming from the Internet, can be divided into two types: (a) packets aimed to the MEqC and (b) packets that are aimed to the application. The packets that are aimed to the MEqC are transferred as is with the fake IP address to the MEqC. The packets that are aimed to the application, having a real source address, are transferred to the PIM to be processed and the real source address is replaced by the appropriate fake source address by using the CDTT. The appropriate checksum calculations may be done according to the protocols to match the fake address. Then the fake source packet is sent via the NEM toward the application via the TCP/IP layer. The PIM may add a directional bit before returning the packet to the NEM, the directional information may be added as a meta data.

Yet in an alternate exemplary embodiment of the present invention, in case that a user equipment does not have an MEqC software, an embodiment of the MEqS may be adapted to get markup language (ML) files, such as but not limited to HTML, XML, WML, etc) that are targeted toward one of the user equipments that is connected to the other side of the LFN; parses the ML file; identifies links to objects that can be requested automatically by a browser application that is used in the user equipment or may be requested by the user himself.

Then the MEqS, in order to resolve the IP address of those links, may set a DNS request cycle with its local DNS server requesting the IP address of each one of those objects. Upon receiving the IP address from its local DNS server, the MEqS can replace the appropriate domain name by its IP address in the appropriate links. After replacing the domain names in all or some of the links the manipulated ML file is sent to the user equipment. Such an exemplary embodiment of a MEqS can reduce some of the RTT periods over the LFN that are due to the DNS queries for those objects.

The present invention may reduce the DNS transportation over the LFN and may reduce the DNS transportation over the Internet if the requested domain name appears in the associated DNS server of the MEqS. Other objects, features, and advantages of the present invention will become apparent upon reading the following detailed description of the embodiments with the accompanying drawings and appended claims.

BRIEF DESCRIPTION OF THE SEVERAL VIEWS OF THE DRAWING

FIG. 5a illustrates a flowchart with relevant step of an exemplary method that may be used at the user equipment in order to route the packets between internal modules of the client;

FIG. 8 illustrates a flowchart with relevant steps of an exemplary method that may be used as an address translator task.

DETAILED DESCRIPTION OF EXEMPLARY EMBODIMENTS

Turning now to the figures in which like numerals represent like elements throughout the several views, exemplary embodiments, aspects and features of exemplary embodiments of the present invention are described. For convenience, only some elements of the same group may be labeled with numerals. The purpose of the drawings is to describe exemplary embodiments and not for production. Therefore features shown in the figures, although in and of themselves may be novel and inventive, are chosen for convenience and clarity of presentation only and should not be used to limit other aspects of the present invention.

Figure 1:
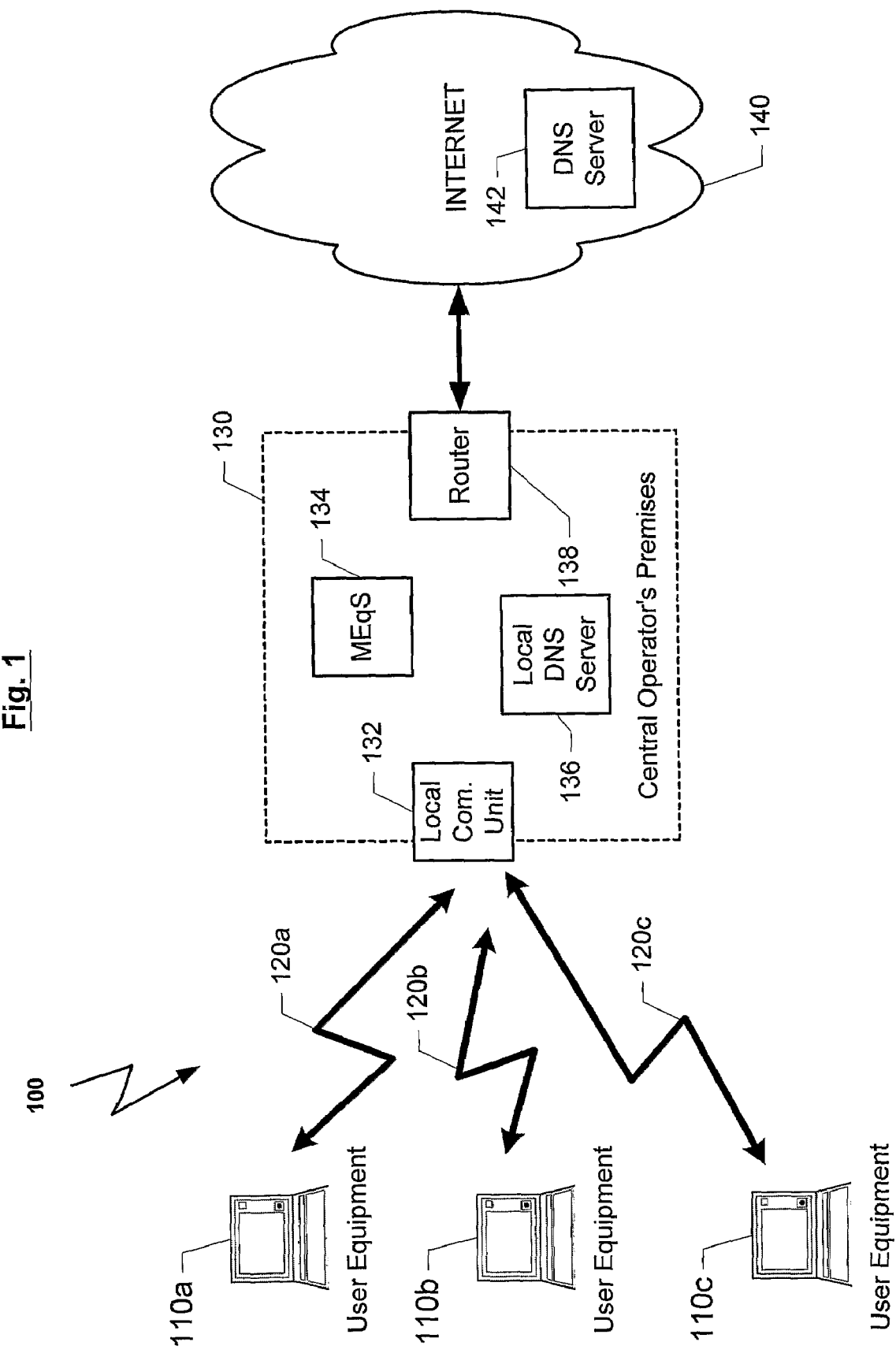
FIG. 1 illustrates a block diagram with relevant elements of an exemplary communication system that implements an exemplary embodiment of the present invention.

FIG. 1 is a block diagram showing relevant elements of an exemplary communication system 100 that is suitable for implementing an exemplary embodiment of the present invention. System 100 may comprise a plurality of User Equipment devices (remote clients) 110a-c. Each User Equipment device 110a-c is shown as being connected over an LFN link 120a-c to a central operator premises (COP) 130. The LFN link 120a-c may be a satellite connection, wireless, cellular, fiber optic cable, etc. The COP 130 also communicates over a network 140 with a plurality of corporate Intra- nets (not shown); a plurality of World Wide Web servers (not shown) and/or a plurality of private Internet users (not shown). The communication over the network 140 can be based on the Internet Protocol (IP). The network 140 may comprise one or more DNS servers 142. It will be appreciated by those skilled in the art that the present invention is not limited to interfacing or serving only three User Equipment devices 110a-c, or three LFN connections 120a-c. However, for purposes of simplicity of understanding, three units of each are shown and described.

The COP 130, among other elements, may comprise a local communication unit 132, a local DNS server 136, an MEqS 134, a router 138 and a network, bus or other communications medium that operates to interconnect these elements. For network interconnectivity, the network may be based on Internet Protocol.

The User Equipment devices 110a-c may be, a computer, a personal computer, a cellular phone, a laptop, a PDA such as a handheld computer, a palm computer, an Internet appliance or any other device having the communications, processing and display capabilities for implementing various aspects of the present invention. In addition, in on exemplary embodiment of the present invention each User equipment device 110a-c may comprise a manipulation equipment client (MEqC) module. The MEqC module may be a software package that is installed in the user equipment 110a-c and in cooperation with the MEqS 134 accelerates the communication over the LFN 120a-c.

The transportation from the User Equipment devices (UE) 110a-c may be transferred through an MEqC module. The MEqC module operates to interrupt the communication to or from the COP 130 and perform some manipulation on the data. An exemplary MEq may operate to add or remove banners directed towards the remote client. Another aspect of the MEq is to improve the speed of the communication and reduce the volume of data over the LFN lines. An MEq may manipulate the data in internal layers, such as: the Transport layer (TCP), in the application layer (HTTP, MAPI etc.) and in the content (html, gif etc.). Within the context of this description, the terms manipulation, optimization and acceleration may be used interchangeably and at times, may have the same meaning.

There are a plurality of types of MEq systems, including but not limited to the manipulation equipment that is described in U.S. Pat. No. 6,273,622 and the following PCT patent applications that have been converted to U.S. patent applications: PCT/IL01/00169 that was converted to U.S. patent application Ser. No. 09/788,545; PCT/IL01/01095 that was converted to U.S. patent application Ser. No. 10/432,835; PCT/IL02/00052 that was converted to U.S. patent application Ser. No. 10/470,406; PCT/IL02/00654 that was converted to U.S. patent application Ser. No. 10/486,393 and PCT application PCT/IL03/00014, the contents of which are incorporated herein by reference.

In addition to accelerating the communication over the LFN 120a-c, the client based MEq and the MEqS 134 may implement an exemplary embodiment of the present invention that is operative to save or reduce the transportation of DNS traffic over the LFN 120a-c. An exemplary embodiment of the present invention may use a fake domain IP address to eliminate the DNS cycle over the LFN 120a-c.

The MEqS 134 performs the DNS query with the local DNS server 136 to resolve the IP address and returns the result to the client. During the communication session, the packets coming from the UE 110a-c may have a fake destination IP address. The MEqS 134 restores the real IP address before forwarding the packet to the network 140. In the download direction the real IP address is replaced with the appropriate fake IP address by the MEqS 134 and the packet with the fake IP address is forwarded to the UE 110*a-c*. More information about the operation of the MEqC is disclosed in details below in conjunction with FIGS. 2, 4, 5*a-d*, 6, 7 and 8.

The transportation between the UEs 110*a-c* and the COP 130 is accomplished over the LFN 120*a-c*. At the COP 130, the connection with the UE 110 *a-c* is ended at a local communication unit 132. Local communication unit 132 may be an access gateway, which converts the traffic to and from the LFN 120*a-c* into an appropriate protocol that fits the requirement of LFN 120*a-c*, on one side, and the COP 130 network, on the other side. For satellite communications, the local communication unit 132 may include a satellite dish with necessary circuitry. Local communication unit 132 may act as an Authentication, Authorization, and Accounting (AAA) agent for the remote client. Local communication unit 132 may be a Remote Access Server (RAS) or any other similar node. An exemplary local communication unit 132 may be manufactured by companies such as, but not limited to, Gilat Satellite, Shin Satellite, Nortel, Nokia, etc. In case that the LFN is cellular network and the COP 130 is a cellular service provider premises, then the local communication unit 132 can be a gateway GPRS support node (GGSN), for example.

The MEqS 134 may receive all the transportation that is transferred between the local communication unit 132 and router 138. The MEqS 134 cooperates with each one of the clients that are located on the different UEs 110*a-c*. In embodiments in which the manipulated data is transferred over, or by means of, manipulation tunnels, the manipulation tunnels exist between the two manipulation units—the MEqC and MEqS 134. If the MEqC impersonates the destination side of the connection, then the MEqS 134 impersonates the remote user while communicating with the appropriate destination. The MEqS 134 also replaces the fake destination IP address with the appropriate real IP address of any packets being uploaded or transmitted to the router 138. In the download direction, the MEqS 134 replaces the source real IP address with the appropriate fake IP address before sending the packet toward the local communication unit 132.

In an alternate exemplary embodiment of the present invention, which is adapted to reduce the number of DNS queries between a clientless user 110*a-c* and the COP 130, the MEqS 134 may receive ML files coming from Router 138; parses (or searches) the ML files, identifies links to objects that may be requested by a browser application or the user himself. Per each link the MEqS 134 may set a DNS request cycle with the local DNS server 136, requesting the IP address of the link.

Upon receiving the IP address of the link, the ML file is manipulated and the IP address is placed instead of the domain name in the appropriate link. After replacing one or more domain names by their IP addresses the manipulated ML file is sent to the appropriate user equipment 110*a-c* via the local communication init 132. More information about the operation of the MEqS 134 is disclosed in detail below in conjunction with FIGS. 4, 5*a-d*, 6, 7 and 8.

The Router 138 may be a common 3rd Layer Switch or other type of router that routes the communication over the Internet 140. An exemplary router may be made by companies such as, but not limited to, Cisco, Juniper, Nortel, Foundry, Avaya and Lucent. From router 138, the communication continues through the Internet 140 to its final destination. In the other direction, the information coming from the network 140 to a remote peer transfers over the same path but in the other direction.

In one exemplary embodiment of the present invention, the local communication unit 132 only routes packets from the UE devices 110*a-c* to the MEqS 134 when those packets have the destination address of the MEqS 134. The local communication unit 132 routes all other packets directly to the router 138. In another exemplary embodiment of the present invention, the MEqS 134 receives all the packets that are transferred from the local communication unit 132 to router 138.

To reduce the load on the MEqS 134 in the download direction, in an exemplary embodiment of the present invention the router 138 may be configured such that the next HOP of the packets going to the UE devices 110*a-c* is the MEqS 134. In an alternate embodiment of the present invention, all the packets transferred from the router 138 to the local communication unit 132 are transferred via the MEqS 134.

Usually, UE devices 110*a-c* and MEqS 134 are configured to send a DNS query to the local DNS server 136. In other embodiments of the present invention, the local DNS server may reside on the network 140 rather than being internal to the COP 130 or reside on the network interfacing the various elements of the COP 130.

Figure 2:
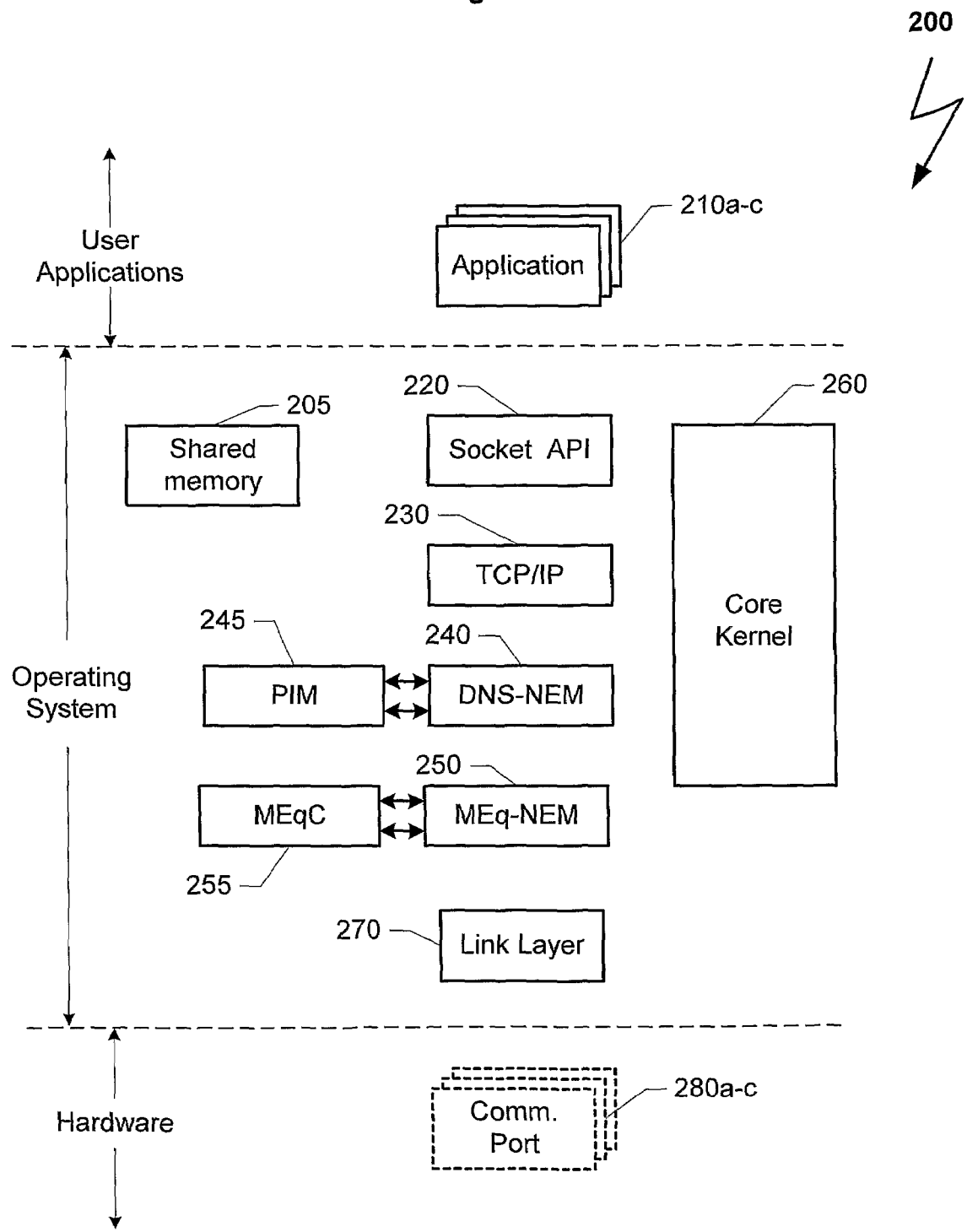
FIG. 2 illustrates a block diagram of relevant software modules in User equipment according to an exemplary embodiment of the present invention.

FIG. 2 is a block diagram illustrating the relevant elements of a client system 200 that uses an exemplary embodiment of the present invention in optimizing DNS traffic by User Equipment devices 110*a-c* (FIG. 1). Exemplary client system 200 may comprise, one or more application modules 210*a-c*, a socket API 220, a TCP/IP module 230, a DNS-NEM module 240, a PIM module 245, an MEq-NEM module 250, a Manipulation Equipment Client (MEqC) module 255, a link layer module 270, a core kernel 260 module, and one or more communication ports 280*a-c*. The socket API 220, the TCP/IP module 230, the link layer module 270 and the core kernel 260 module represent the operating system of the user equipment 110*a*. Client system 200 may also comprise a shared memory module 205. The shared memory 205 may be volatile or non-volatile memory that may carry the communication between the different modules of client system 200. It will be appreciated by those skilled in the art that the present invention is not limited to three applications 210*a-c*, or three communication ports 280*a-c*. However, for purposes of simplicity of understanding, three units of each are shown. In an alternate exemplary embodiment of the present invention the MEqC 255 may reside in the user application section of client system 200.

Some of the application modules 210*a-c* may communicate over network 140 (FIG. 1). Exemplary applications can include: EMAIL applications such as, but not limited to, MICROSOFT OUTLOOK, MICROSOFT OUTLOOK EXPRESS; browses applications such as, but not limited to, MICROSOFT INTERNET EXPLORER, NETSCAPE (NETSCAPE is a trademark of AOL), etc.

In an exemplary embodiment of the present invention, the data transportation between a user equipment devices 110*a-c* and the network 140 (FIG. 1) flows from/to an application 210*a-c* to/from a physical communication port 280*a-c* via the appropriate socket API 220, transport module 230, DNS-NEM 240, MEq-NEM 250, and the link layer 270. In the WINDOWS operating system, an exemplary socket API module 220 may be a WINSOCK. Other operating systems may use other types of socket APIs 220. Transport module 230 may include, but is not limited to, the TCP/IP suite of protocols.

The link layer (link layer) 270 may include one or more device drivers, port drivers, etc. The communication ports 280*a-c* may include, but are not limited to, USB, FireWire, PCMCIA bus, SCSI bus, iSCSI, Cellular, Infiniband, Serial, Parallel, LAN port, Fiber Channel, Infrared, wireless communication (such as but not limited WiFi, Bluetooth, etc.) or other communication port interfaces, structures or protocols.

The MEqC 255 may operate to improve the speed of the communication and reduce the volume of data transmitted over the LFN 120a-c. A pair of MEq modules may impersonate a termination point and respond in the name of the other side of the connection to increase the speed of the communication. For example, if an original connection is based on TCP/IP, then the MEq may respond to the reception of a TCP/IP packet by sending an acknowledgement packet instead of the equipment on the other side of the connection sending the acknowledgement packet. In such embodiment, the MEqC 255 may include a TCP/IP section that communicates with the TCP/IP module 230 during the impersonation stage. The MEqC 255 may manipulate the data in internal layers, such as: the Transport layer (TCP), in the application layer (HTTP, MAPI etc.) and in the content (HTML, gif etc.).

As a general example, the MEqC 255 may establish a tunnel between the MEqC 255 and the MEq server (MEqS) 134 (FIG. 1) over the LFN 120a-c. In addition to its acceleration process, an exemplary MEqC 255 may be configured to handle DNS queries by piggybacking a DNS request on the first packet of a new connection. Piggybacking the DNS request on the first packet can be done via the tunnel (DNS tunnel) that was established between the MEqC 255 and the MEqS 134 (FIG. 1). In an alternate embodiment of the present invention, the MEqC 255 may be embedded as part of the PIM 245. More information on the operation of the MEqC 255 in relation to accelerating a DNS query is disclosed below in conjunction with the description of FIGS. 4 and 5a-d. The MEqC 255 may get and send packets via an NEM module— MEq-NEM 250—which is installed in the chain between the applications 210a-c and the link layer 270.

One or more DNS network extender modules may be installed between the transport layer 230 and the link layer 270, for example, DNS-NEM 240 or MEq-NEM 250. The DNS-NEM 240 and the MEq-NEM 250 may be adapted to route IP packets that are transferred to/from the link layer 270 from/to the transport layer 230. The packets are routed toward the plug in module (PIM) 245 or MEqC 255, respectively. The PIM 245 may process the packet and transfer the processed packet toward the MEqC 255 via the DNS-NEM 240 and the MEq-NEM 250, or may return the packet to the DNS-NEM 240 to be sent toward the link layer 270 or the application 210a-c. Other exemplary embodiments of the present invention may locate the DNS-NEM 240 or the MEq-NEM 250 between two other layers. For example, the DNS-NEM 240 may be installed between the socket API 220 and the transport module 230 (in the TDI layer, for example, in WINDOWS environment).

Other exemplary embodiments may use an intermediate driver as a layer existing between the TCP/IP layer 230 and the link layer 270. The intermediate driver may have the functionality of the DNS-NEM 240 and the PIM 245. Other exemplary embodiments may use a product such as Deterministic Network Extender (DNE) delivered by Deterministic Network from Santa Cruz, Ca. USA to route the packets to PIM 245 and/or MEqC 255.

Exemplary embodiments of the present invention may select which type of IP packets will be redirected. For instance, an exemplary embodiment of the present invention may configure the DNS-NEM 240 or the MEq-NEM 250 to redirect only TCP packets. Another exemplary embodiment of the present invention may redirect the transportation of TCP packets as well as UDP packets. Yet another exemplary embodiment may redirect all IP transportation. In an alternate embodiment of the present invention, the DNS-NEM 240 and the MEq-NEM 250 may be implemented in one NEM module that may redirect packets to the PIM 245 or to the MEqC 255 according to the packet type and the values of the addresses with the packets. More information on the operation of the DNS-NEM 240 and the MEq-NEM 250 is disclosed below in conjunction with the description of FIGS. 4 and 5a-d.

In an exemplary embodiment of the present invention, the PIM 245 may be configured to identify DNS request packets and then operate to manipulate them. Identifying the DNS packets may be based on their type and port number. A DNS request is a UDP packet having a destination port number '53'. In an alternate exemplary embodiment of the present invention in which the DNS-NEM 240 is installed in a higher level, a DNS request may be identified by the type of a system call that is used. For example, the function "gethostbyname" that is initiated by an application 210a-c to start a connection may be identified as a DNS request.

Upon receiving a DNS request packet, the PIM 245 may respond by formulating a DNS reply with a fake IP address, and transmitting the DNS reply to the source of the request (one of the applications 210a-c). Sending the response (with the fake IP address) may be done via the DNS-NEM 240. It will be appreciated that the fake IP addresses may be selected from the private address space. For example, RFC 1918 defines the following addresses as private IP addresses: 172.16.0.0 to 172.31.255.255; 192.168.0.0 to 192.168.255.255; etc. Some embodiments of the present invention may allow an administrator to define certain private addresses that are not used by the computer as the fake addresses, etc. Replacing the real IP address with the fake IP address, and vice versa, requires additional processing of the packet. For example, new checksum calculations have to be created in accordance with the communication protocol, taking into consideration the fake IP address.

The PIM 245 may create a Client DNS translation table (CDTT) and save the fake IP address and the name of the domain in an entry in the CDTT. The client DNS translation table may be used to maintain the connection and to translate the fake IP address to the real one and vice versa. The CDTT can be stored in shared memory 205. The MEqC 255 may have access to the CDTT.

Upon receiving a packet with fake IP address, the application 210a-c that initiated the DNS request may send a first packet to the destination represented by the fake IP address. If the first packet cannot be manipulated by the MEqC 255, then it is routed by the DNS-NEM 240 to the PIM 245. The routing decisions can be based on port ID number, for example. The first packet is identified by PIM 245. The PIM 245 may be configured to retrieve the appropriate domain name from the client DNS translation table and associate it with the first packet. An association of the first packet and the domain name may be made by piggybacking the domain name on the first packet. Piggybacking the domain name or other information onto a packets is performed in accordance with the protocols used for transmission, and as such, additional processing such as checksum recalculations may be required to accommodate and cover the piggybacked information. Alternatively, the domain name may be sent as a special message instead of being piggybacked on the first packet. In another alternate embodiment, the domain name may be sent in a prior packet informing the receiver about the fake domain IP address packet that is coming. In either case or in other techniques not disclosed but anticipated, this element of the invention simply provides a mechanism for the remote client side to send to the MEqS 134, information that informs the MEqS 134 that a particular fake IP address is associated with a particular domain or real IP address.

Sending the association may be done via a tunnel that can be established between the PIM 245 and an appropriate module in the MEqS. The appropriate module may be a filter module or the DNS task (module). In another embodiment, the association may be sent from the PIM 245 to the appropriate module in a packet that has the destination address set to the address of the appropriate module. As an example, the packet that carries the association can be a UDP/IP packet with a unique IP port number. The association is transferred to link layer 270 via the DNS-NEM 240 and the MEq-NEM 250. More information on the operation of the PIM 245 is disclosed below in conjunction with the description of FIGS. 4 and 5*a-d*.

If the first packet can be manipulated by the MEqC 255, then the first packet is routed by the MEq-NEM 250 to the MEqC 255. The MEqC 255 may respond in accordance with its common operation, for example impersonating the destination during a synchronization step. In addition the MEqC 255 may be configured to retrieve the appropriate domain name from the client DNS translation table and add it as a piggyback over an appropriate packet (i.e., the first packet with data) in accordance with the checksum and other requirements of the protocol. If the length of the packet including the piggyback information exceeds the maximum length, then the domain name may be sent as a special message rather than being piggybacked on another message. The appropriate packet with the piggyback is transferred to the link layer 270 via the DNS-NEM 240 and the MEq-NEM 250.

Figure 3:
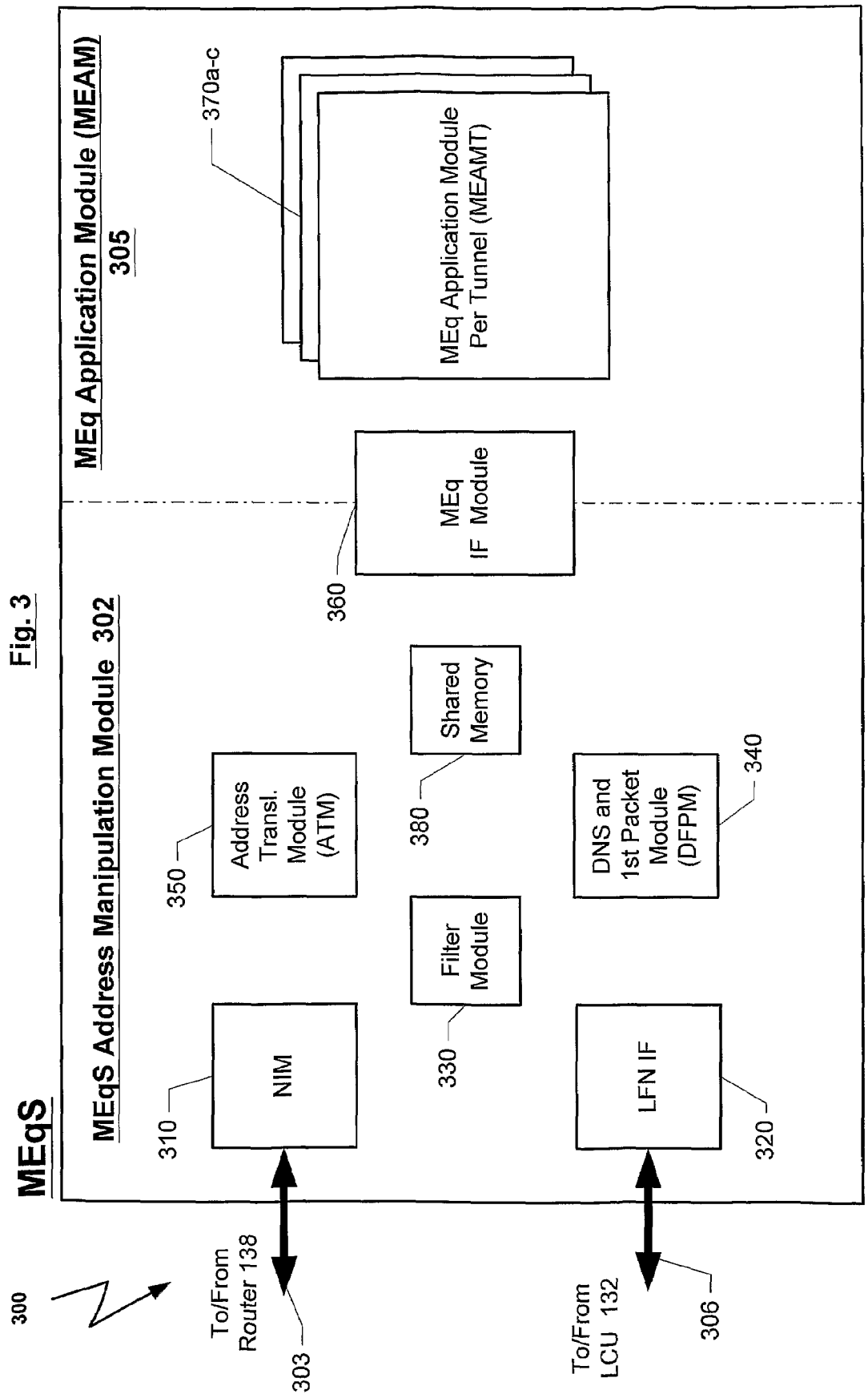
FIG. 3 illustrates a block diagram of relevant software modules in a MEq Server according to an exemplary embodiment of the present invention.

FIG. 3 is a block diagram illustrating relevant elements of an exemplary embodiment 300 of the MEqS 134 (FIG. 1) that may be used in the COP 130 (FIG. 1). In the example presented in FIG. 3, two main modules are illustrated: (a) the MEqS Address Manipulator Module 302 and (b) the MEq Application Module (MEAM) 305. An interface module, MEq IF 360, interfaces between the two sections 302 and 305. The MEqS address manipulator module 302 may comprise, among other modules: Network Interface Module (NIM) 310; LFN Interface (LFN IF) 320; filter module 330; DNS and first packet module (DFPM) 340; Address translator module (ATM) 350; and a shared memory 380. The MEAM 305 may comprise one or more MEq applications (MEAMT) 370*a-c*, one per MEq tunnel. The system 300 may transmit or receive data traveling to and from the network 140 via router 138 (FIG. 1) through connection 303 and transmit or receive data traveling to and from the LFN 120*a-c* via connection 306.

In an alternate exemplary embodiment of the present invention, which is adapted to reduce the DNS request cycles over LFN 120 (FIG. 1) of a clientless user equipment 110*a-c*, MEqS Address Manipulator Module 302 may comprise an ML manipulator module (not shown in the drawing).

NIM module 310 and LFN IF module 320 are network interface modules that receive incoming data from both networks (network 140 and LFN 120 in FIG. 1) via connections 303 and 306 respectively. The NIM module 310 and the LFN IF module 320 process the incoming data in accordance with their network protocols and translate the information received into packets. These packets are then transferred to the filter module 330. For data that is being directed towards the networks 120 and 140 (FIG. 1), both the NIM 310 and LFN IF 320 receive packets from the internal modules of system 300, handle the packets according to the network protocols, and then transmit the data over the appropriate connection 303 or 306 to its destination.

Filter module 330 may receive the incoming packets from both the NIM module 310 and the LFN IF module 320. The incoming packets may wait in a queue until they are processed. The queue may reside in the shared memory 380. The filter module 330 may analyze the packet and determine which internal module to route the packet. The packet can be routed directly to the other network interface module, to the DFPM 340, to the ATM 350 or to MEq IF module 360. The routing decision can be based on the type of the packet, the IP addresses of the packet and the next process that may be needed. More information on the operation of the filter module 330 is disclosed below in conjunction with the description of FIGS. 4 and 6. Routing the packets between the different modules of system 300 may be accomplished by sending the packet, or by simply sending a pointer to the location of the packet and its meta data in the shared memory 380. The pointers may be stored in a queue that is associated with the appropriate modules. The queues may reside in the shared memory 380.

The DFPM 340 is responsible for managing the DNS cycle for a new connection having a fake IP address. One of the primary tasks associated with managing the DNS cycle for a new connection is obtaining an association of a fake IP address and a domain name. After replying to a new connection request, the DFPM 340 may receive, via the filter module 330, a first packet from the requesting UEs 110*a-c* (FIG. 1) that contains the fake destination address that was included in the reply to the DNS connection request. In one embodiment, the first packet to the fake IP address may be associated with the name of the domain associated with the new connection. The DFPM 340 may be configured to respond to the reception of the first packet targeted to the fake IP address by initiating a server DNS task. The server DNS task may save the received domain name and the fake address in an entry in a Server DNS Translation Table (SDTT). The entry in the SDTT may also include fields for the source IP address, the source IP port, the fake destination IP address and the real destination IP address and port and an ID number of the MEq tunnel that is associated to the UE 110*a-c* that sent the first packet. In addition the SDTT may include fields for additional parameters that are relevant to the connection, as is further disclosed below. The SDTT may reside in the shared memory 380 and is accessible by the ATM 350. The domain name may be associated with the first data packet in a special message or in a prior packet or being a piggybacked on the first packet of the connection. If the domain name is sent as a special message or as a prior packet, the special message or the prior packet is processed instead of the first packet including the piggybacked information. Then the DFPM 340 may formulate a DNS request including the domain name, and send the DNS request to the local DNS server 136 (FIG. 1) through the NIM 310.

The information associating the first packet and/or the fake IP address with a domain may be sent in a variety of manners dependent upon other things, whether the MEqC and MEqS can manipulate the communication. If the communication can be manipulated, then the information conveying the association is sent in the DNS tunnel that connects the MEqC and the MEAM 305. If the communication cannot be manipulated, the information conveying the association may be sent in a tunnel that connects PIM 245 (FIG. 2) with DFPM 340 or the information conveying the association may be embedded by PIM 245 in a UDP packet with a unique UDP port number. The UDP packet can be sent to the DFPM 340. Filter module 330 is adapted to identify the association and redirect the UDP packet to DFPM 340. Identifying the association in one exemplary embodiment may be based on the unique UDP port number or a special field in the SDTT. In an alternate embodiment, a dedicated field in the header of a DNS tunnel packet may mark the association. Another exemplary embodiment of the present invention may use both methods—a field in the header as well as a field in the SDTT.

Upon subsequently receiving a DNS response with the real IP address of the domain via NIM 310 and the filter 330, the appropriate entry in the SDTT is updated with the real IP address. After receiving the real IP address, DFPM 340 may continue and handle the process of the first response packet together with ATM 350, filter 330 and MEq IF 360 as it is disclosed below in conjunction with the description of FIGS. 4, 6, 7 and 8.

When a connection is terminated, the entry in SDTT associated with the terminated connection is released or deleted. Other exemplary embodiments of the present invention may release the entry at the end of a certain period (e.g. a delay period) after the termination of the connection. The period may be configured to coincide with the period of time that a common cache exists. In an alternate embodiment, the period of time for the delay can be a fixed time, e.g. 12, 24, 48 hours, etc. Other embodiments may be configured to release an entry upon receiving a command from the remote client.

In an alternate embodiment of the present invention, DFPM 340 may include a DNS cache. The DNS cache may be searched by the DFPM 340 for the IP address domain name that is associated with the domain name before applying to the local DNS server.

ATM 350 is responsible to replace a fake IP address with a real IP address and vice versa. In one communication direction, the ATM 350 may receive via NIM 310 and filter module 330 packets coming from network 140 (FIG. 1) and directed towards one of the MEAMT 370*a-c*. The source IP address carried by such packets include a real domain IP address. Therefore, the real domain IP address needs to be replaced with the appropriate fake IP address before transferring the packet to the MEq IF 360.

In the other communication direction, the ATM 350 receives packets coming from one of the MEAMT 370*a-c* via the MEq IF 360 and directed towards a destination having a fake IP address. The fake IP address has to be replaced with the real IP address prior to being transferred to the network 140 (FIG. 1) via NIM 310. The ATM 350 may search for the appropriate entry in the SDTT from which the real or the fake IP addresses can be retrieved. Replacing the real domain IP address with the fake IP address and vice versa requires additional processing of the packet. For example, a new checksum value must be calculated. More information on the operation of the ATM 350 is disclosed below in conjunction with the description of FIGS. 4, 6, 7 and 8.

In an exemplary embodiment of MEqS address manipulator module 302, which is adapted to handle clientless user equipment, the ML manipulator module (MMM) receives ML files coming from the Internet 140 (FIG. 1) via NIM 310 and filter 330; parses (searches) the ML files, identifies links to objects that may be requested by a browser application or the user himself. Per each link the MMM may set a DNS request cycle with the local DNS server 136 via NIM 310, requesting the IP address of the link.

Upon receiving the IP address of the link, MMM may manipulate the ML file and places the IP address instead of the domain name in the appropriate link. After replacing one or more domain names with their IP addresses the manipulated ML file is sent to the appropriate user equipment 110*a-c* via LFNIF 320. In such an exemplary embodiment of the present invention filter module 330 may be adapted to transfer ML transportation toward the MMM.

The MEq IF 360 manages the communication between the plurality of MEAMT 370*a-c* and the plurality of UEs 110*a-c* (FIG. 1). The MEqS 300 responds to a request for establishing a connection, which comes from one of the MEqCs 255 (FIG. 2) in a UE 110*a-c* via LFN IF 320 and filter 330, by establishing a tunnel and assigning one of the MEAMT 370*a-c* to the requester. As long as the connection exists, the MEq IF 360 may receive manipulated packets coming from the MEqC 255 via the associated tunnel, LFN IF 320 and filer 330. The received packets may be targeted to the associated MEAMT 370*a-c* and may be associated with a fake IP address. The associated MEAMT 370*a-c* may reconstruct the packet and send it to the fake destination IP address via the MEq IF 360.

In one exemplary embodiment, the packets are transferred to/from the associated MEAMs 370*a-c* and the MEq IF 360 via the shared memory 380. In an alternate embodiment of the present invention, the communication between MEq IF 360 and the MEAMT 370*a-c* is conducted over a data communication path that can be based on an Internet Protocol, for example. In cases that the transportation over COP 130 is heavy, the system 300 may be configured to include two or more servers. In such a case, one server may include the MEqS address manipulation module 302 with the MEq IF 360 and the other server may include the MEq Application module 305. The communication between the two servers can be conducted over an IP network.

After reconstructing the packet, the reconstructed packet with the fake destination domain IP address is sent to the MEq IF 360 and from there to ATM 350. The ATM 350 may replace the fake IP address with the real IP address, according to the SDTT, and the reconstructed packet may be sent to its destination over network 140 via NIM 310. Return packets from network 140 to one of the MEAMT 370*a-c* are transferred via the NIM 310 and the filter 330 to the ATM 350. The ATM 350, based on the real IP address, may search the SDTT for the associated entry, retrieve the fake domain IP address, and replace the real IP address with the appropriate fake IP address. Additional process may be performed on the packet, including but not limited to, calculating the checksum bits of the packet. The packet with the faked IP address is then sent to the appropriate MEAMT 370*a-c* via MEq IF 360 for manipulation. The manipulated packet with its associated fake domain IP address is sent via the MEq IF 360 and the associated tunnel over the LFN IF 320 to the appropriate client system 200 (FIG. 2).

Figure 4:
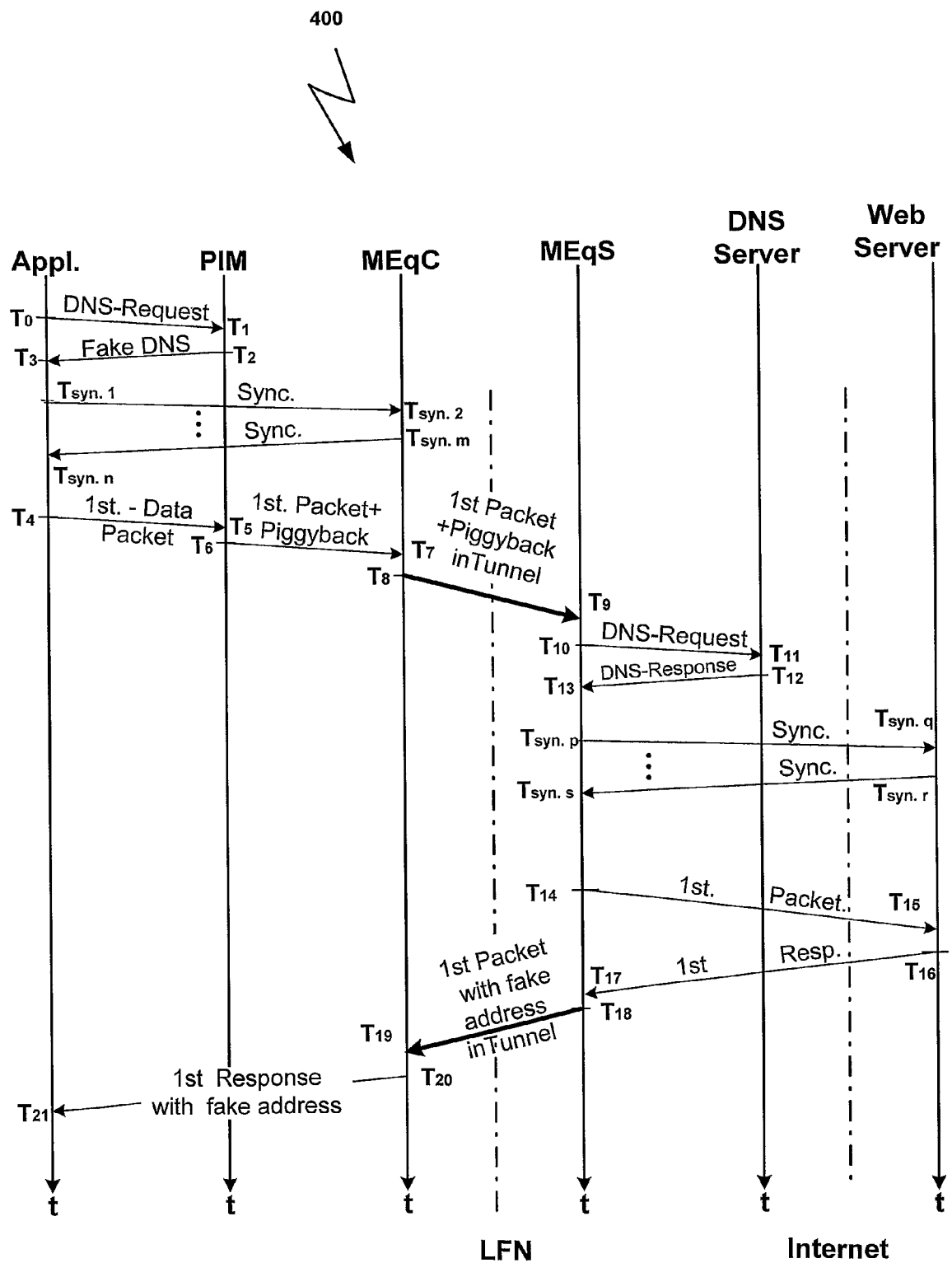
FIG. 4 illustrates communication sequencing between an application running over the user equipment and a web server.

FIG. 4 illustrates a time diagram 400 describing a communication sequence between an application 210*a-c* (FIG. 2) running over client 200 and a web server in network 140 (FIG. 1) via LFN 120*a-c* and MEqS 134. The communication that is depicted in the example of FIG. 4 belongs to a packet type that can be manipulated by MEqC 255 (FIG. 2) and MEAM 305 (FIG. 3), for example a TCP/IP packet. The time diagram 400 depicts three locations in a client system 200 (FIG. 2): (1) in one of the applications 210*a-c*; (2) in the PIM 245 and (3) in the MEqC 255, and two locations in the COP 130 (FIG. 1): (1) at the MEqS 134 and (2) the local DNS server 136; and one location at the network 140—at the web server.

To establish a new connection, at T0 one of the applications 210*a-c* (FIG. 2) may issue a DNS request. The DNS request packet is captured by DNS-NEM 240 (FIG. 2) and is then transferred to the PIM 245 at T1. The PIM 245 may process the request and send a fake DNS response at T2 with a fake IP address to the application via the DNS-NEM 240. At T3 the application gets the fake response. In response to receiving the fake response, the application may try to set a connection with the fake address and at Tsyn.1, send a request to set the connection. The request is captured by the NEM-MEq 250 and is transferred at Tsyn.2, to the MEqC 255 (FIG. 2), which impersonate the destination and may reply with an acknowledge message. This handshake may require a few more transactions and at Tsyn.n, the connection is set. At T4, a first data packet is sent to the fake IP address by the application 210. At T5 the first packet targeted to the fake IP address is received at the PIM 245 via DNS-NEM 240. The PIM 245 processes the first packet and creates an association of the first packet with a piggyback message for the first packet, the piggyback message containing the domain name. At T6, the first packet with the piggyback message is transferred to the MEqC 255. In one exemplary embodiment of the present invention, transferring the packet to the MEqC 255 may be performed via the shared memory 205 (FIG. 2). In an alternate embodiment of the present invention, the first packet with the piggyback message may be transferred to MEqC 255 via DNS-NEM 240 and MEq-NEM 250. It should be noted that the terms "DNS request", and "DNS query" are used interchangeably herein and that the terms "DNS response", and "DNS answer" are used interchangeably herein.

At T7 the first packet along with the piggyback message is received by the MEqC 255. The MEqC processes the packet and may initiate a tunnel with MEqS 134 (FIG. 1) over LFN 120a-c. Alternatively, the MEqC 255 may use an existing tunnel. In either case, at T8 the MEqC 255 sends the manipulated first packet with the piggyback message to the MEqS 134 (FIG. 1) via the tunnel over the LFN 120a-c.

At T9 the manipulated first packet with the piggyback message arrives at the MEqS 134, processed by the LFN IF 320 (FIG. 3), the filter 330 and the DFPM 340. The DFPM 340 may initiate a DNS request with the domain name that was embedded in the piggyback message and transfer the DNS request to the NIM 310. At T10 a DNS request is sent to the local DNS server 136 (FIG. 1). The request is received at T11 and at T12, a DNS response with the IP address is returned to the MEqS 134.

At T13, the DNS response is received at the MEqS 134. The DNS response is transferred via the NIM 310 (FIG. 3) and the filter 330 to the DFPM 340. The DFPM 340 processes the response and updates the appropriate entry in SDTT with the real IP address. Then the first packet, with the fake IP address, is transferred to the MEq IF 360 for reconstructing, at one of the MEAMT 370a-c, before being sent to the NIM 310 via ATM 350. In response to receiving the first packet with the fake IP address, the MEAMT 370a-c may try to setup a connection with the fake destination and at Tsync.p, send a request to setup the connection with the fake destination. The request is transferred via the ATM 350 for changing the fake destination IP address into the real one, based on the relevant entry in SDTT. From the ATM 350, the request having the real destination IP address is sent toward the web-server. At Tsyn.q, the destination web server may reply with an acknowledgment. This handshake may take few a more transactions and at Tsyn.s, the setup of the connection is complete. At T14 the first reconstructed data packet having the fake destination address is sent via ATM 370 to the web server over network 140 (FIG. 1) via the NIM 310.

At T15 the first packet is received at the web server and at T16 a response to the first packet is sent over the network 140 to the MEqS 134. At T17 the first response arrives at the MEqS 134, processed by the NIM 310 (FIG. 3) and the filter 330. The real source domain IP address of the response packet may be replaced with the appropriate fake address by ATM 350. Then the first response packet, with the fake IP address, may be transferred via the MEq IF 360 to the MEAMT 370a-c. At T18, the MEAMT 370 sends the manipulated packet with a fake source IP address to the MEqC 255 (FIG. 2) via the LFN IN 320 to the appropriate UE 110a-c (FIG. 1) over the tunnel in the LFN 120a-c.

At T19, the MEqC 255 receives the first manipulated response having a fake domain IP address, processes it and transfers the first reconstructed response with a fake IP address via the MEq-NEM 250 to the application 210a-c that initiate the request at T19. The first reconstructed response reaches the application at T21. At this point in time, the handling process of the DNS request and the first packet, which were initiated at T0 by one of the applications 210a-c, is terminated.

FIGS. 5a, 5b, 5c and 5d are flow diagrams illustrating relevant steps of exemplary processes that may be used by a client module 200 (FIG. 2) at the UE 110a-c (FIG. 1). The process 500a (FIG. 5a) illustrates an exemplary task that may be implemented by an exemplary DNS-NEM 240 (FIG. 2) to route the appropriate packets to and from the PIM 245. Processes 500b, c and d (FIG. 5b-d) illustrate exemplary tasks that may be implemented by an exemplary PIM 245 (FIG. 2) to process and manipulate DNS queries and responses during establishing a new connection as well as handling fake IP addresses during the connection.

In an alternate exemplary embodiment of the present invention a single module may be used instead of DNS-NEM 240 and PIM 245 (FIG. 2). In such embodiments, the processes 500a-d may be implemented by the single module to catch the transportation from and to a UE 110a-c and manipulating the IP address in the appropriate packets.

During a power-on cycle 505, various initialization tasks may be performed, such as the client module 200 (FIG. 2) being reset, the CDTT being reset, cleared or set to default values, initiating or clearing the different queues in the shared memory 205 (FIG. 2), and providing each task with the location of the different queues in the shared memory as well as the fields and the meaning of the different flags and status that may be added during the processing of a packet. The flags and status may be added as meta data to the packet and stored in the shared memory in association with the packet. The flags and status may indicate the history of the packet, as well as future actions that are needed. In addition, the flags and status may point the direction of the packet, the next internal communication modules to which the packet is targeted, etc.

After the power-on cycle 505 is complete, at step 510 the process 500a may check whether a pointer to a packet exists in a queue that is associated with DNS-NEM 240. If the queue is empty, process 500a may wait for a period 'D' at step 512 and then return to step 510 to recheck the queue. The period 'D' can be in the range of few microseconds to few milliseconds. If at step 510 a pointer is found in the queue, the packet associated with the pointer, along with its associated meta data may be retrieved at step 515 from the shared memory 205 and the pointer to the packet released from the queue. The packet and the meta data are processed and, based on the destination and source addresses as well as relevant flags (which are depicted in the following paragraphs), at step 520 a decision is made whether the direction of the packet is outbound or inbound (whether the packets arrived from the LFN 120 (FIG. 1) or is targeted to the LFN).

If it is determined at step 520 that the direction of the packet is inbound, then a decision is made at step 522 whether the packet is one of three types: (a) a packet with a fake source IP address, (b) a fake DNS response that returns from PIM 245 (FIG. 2) or, (c) any other inbound packet (a packet with real source IP address) that was arrived via link layer 270 (FIG. 2) and is not an association of a first packet with a piggyback. For the first two types, a fake DNS response or an inbound packet that has a fake source IP address can be identified by the fake IP address and an appropriate field in the associated meta data that is set by the PIM 245 thereby indicating that the packet can be forwarded toward the appropriate application. If at step 522 the packet is a packet with fake source IP address or a DNS response, then the packet is forwarded at step 524 to the TCP/IP module 230 (FIG. 2) and, via the socket API 220, to the appropriate application 210*a-c* (FIG. 2). After forwarding the packet, its associated meta data and the associated entry in the shared memory can be released.

If at step 522 the packet is not any one of the above types, then the packet is a packet that just arrived via the LFN 120 and may be treated by PIM 245. For example, this would include an association packet (one that includes piggybacked information regarding the domain name) that is targeted to PIM 245 or a packet with a real source IP address. Therefore, an entry in the shared memory is assigned at step 526 to the packet. Meta data may also be added to the packet indicating the direction of the packet and a pointer to the packet is transferred to the PIM 245. In response to receiving the pointer, the PIM 245 may process the packet according to the exemplary process 500*d* depicted in FIG. 5*d*. After transferring the packet to the PIM 245, process 500*a* returns to step 510 examining the queue for the next pointer to a packet.

In an alternate embodiment of the present invention (not shown in the drawings) the pointer to the packet is transferred at step 526 to PIM 245 through a queue that is associated with process 500*d* (FIG. 5*d* point 'D' step 540) and then process 500*a* returns to step 510 examining the queue for the next packet. From time to time process 500*d* checks its queue looking for a pointer to a packet.

Returning now to step 520, if the direction of the packet is outbound, then a decision is made at step 530 whether the packet is one of three types: (a) a packet having a fake destination IP address which invokes continued processing at step 535 and 536; (b) a DNS request packet which invokes continued processing at step 533 and 534 or (c) all other type of packets, including but not limited to, (i) packets with a real destination IP address, (ii) a packet with a destination address of DFPM 340 and includes an association of first packet and a domain name, or (iii) a packet with fake destination IP address that its meta data indicates that the packet can be transferred to the MEqC 255 via MEq-NEM 250, all of which invoke continued processing at step 531 and 532. The decision 530 on the type of the packet can be based on the type to the packet (TCP/IP or UDP/IP, for example), the destination address and port numbers, as well as the meta data that is associated with the packet. If at step 530 the packet belongs to the all other category 531, then the packet is forwarded 532 to communication port 280 (FIG. 2) via the link layer 270 (FIG. 2). After forwarding the packet, its associated meta data and the associated entry in the shared memory can be released.

Figure 5B:
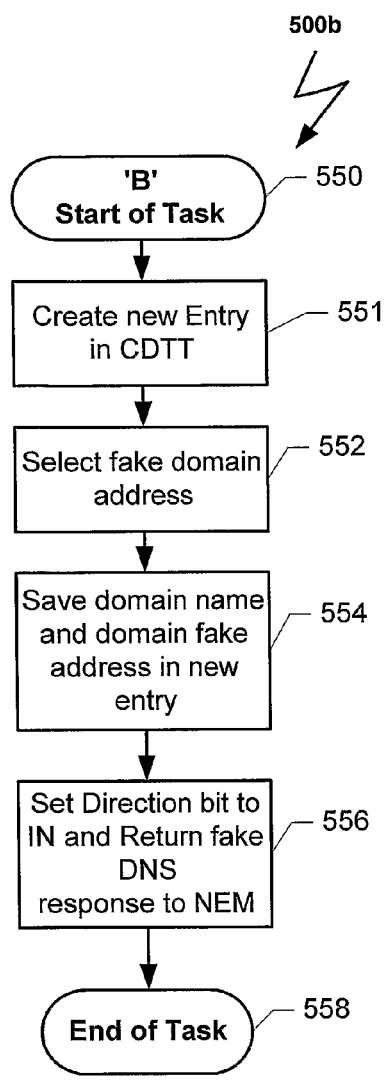
FIG. 5b illustrates a flowchart with relevant step of an exemplary method that may be used at the user equipment in order to process and manipulate DNS requests.

If at step 530, the packet is a DNS request 533, the DNS request can be modified by the exemplary embodiment of the present invention and may be treated by the PIM 245. Therefore an entry in the shared memory is assigned to the packet at step 534. Meta data may be added to the packet indicating that the packet is a DNS request coming from one of the applications 210*a-c*. Then a pointer to the packet is transferred to the PIM 245 at step 534. In response to receiving the pointer, the PIM 245 may process the packet according to the exemplary process 500*b* (FIG. 5*b*). After transferring the packet to the PIM 245, the process 500*a* returns to step 510 to examine the queue for the next packet.

In an alternate embodiment of the present invention (not shown in the drawings) process 500*b* may be a task that runs in a loop as long as the client is active. Process 500*b* may be one of the tasks that are performed by the PIM 245. In such an embodiment, process 500*b* may be associated with a queue. The queue may be checked periodically or at the end of each loop. At the end of step 534, a pointer to the packet is transferred to the PIM 245 to a queue that is associated with process 500*b* (FIG. 5*b* step 550) and then process 500*a* returns to step 510 to examine the queue for the next packet.

Figure 5C:
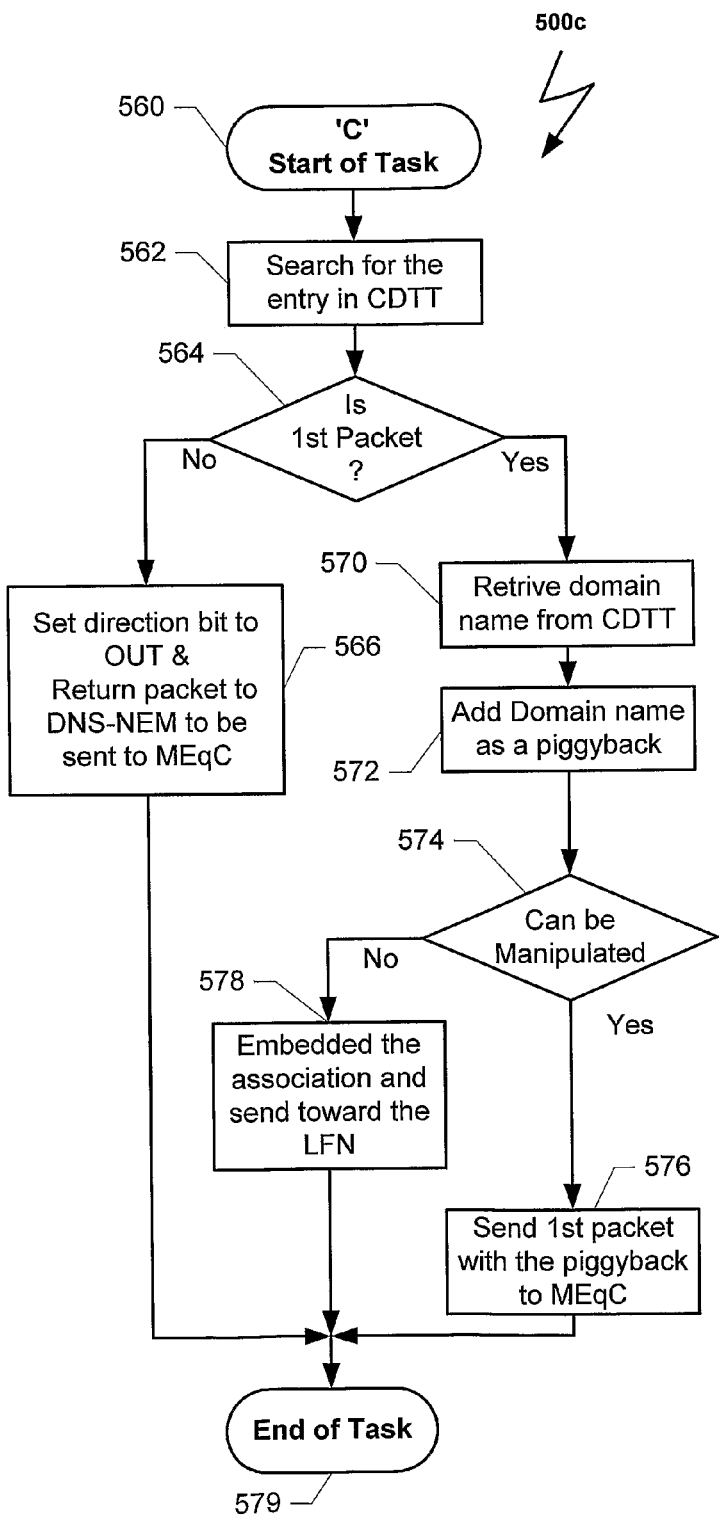
FIG. 5c illustrates a flowchart with relevant step of an exemplary method that may be used at the user equipment in order to route outbound packets having fake domain IP address.

If at step 530 the packet has a fake DNS destination address with a fake IP address, then an entry in the shared memory is assigned to the packet. Meta data may be added to the packet indicating that the packet is targeted toward the LFN 120*a-c* (FIG. 1). Then a pointer to the packet is transferred to the PIM 245 at step 536. In response to receiving the pointer, the PIM 245 may process the packet according to exemplary process 500*c* (FIG. 5*c*). After transferring the packet to the PIM 245, process 500*a* returns to step 510 to examine the queue for the next packet of DNS-NEM 240 (FIG. 2).

In an alternate embodiment of the present invention (not shown in the drawings) process 500*c* may be a task that runs in a loop as long as the client is active. Process 500*c* may be one of the tasks that are performed by the PIM 245. In such an embodiment, process 500*c* may be associated with a queue. The queue may be checked periodically or at the end of each loop. At the end of step 536, a pointer to the packet is transferred to PIM 245 to a queue that is associated with process 500*c* (FIG. 5*c* point 'c', step 560) and then process 500*a* returns to step 510 to examine the queue for the next packet.

Referring now to FIG. 5*b*, exemplary process 500*b* is described. Process 500*b* may be issued or initiated at step 550 by the PIM 245 (FIG. 2) upon receiving, from DNS-NEM 240, a pointer (step 534 in FIG. 5*a*) to a DNS request packet. Upon initiation, process 500*b* may create a new entry in the CDTT at step 551. The new entry in the CDTT will be associated with the new connection to the new domain name. Next, a fake IP address is selected at step 552 from the list of available fake IP addresses. The list of the fake IP addresses may be stored in the shared memory. The domain name and the selected fake IP address are stored at step 554 in the associated entry in CDTT. In an embodiment of the present invention, the CDTT may include additional fields that may be used during the duration of the connection. The additional fields may include, but are not limited to: a field for indicating whether a first packet that is associated with the new connection has been sent, a field for indicating whether a first response that is associated with the new connection as been received, etc. In such an embodiment the first packet field and the first response field in the new entry are reset. The entry in the CDTT is released when the connection is terminated. It should be noted that the terms "first packet", "first packet with payload" and "first data packet" are used interchangeably herein.

Other embodiments of the present invention may release the associated entry after a certain period of time from the termination of the connection. An alternate embodiment of the present invention may use the field of "DNS response Time To Leave (TTL)", then the entry in the CDTT may be released at a certain period after the TTL. The period may also be related in some manner to the period of time that a common cache exists. In an alternate embodiment, the period can be a fixed time, e.g. 12, 24, 48 hours, etc. Other embodiments may use other criteria for releasing an entry in the CDTT or SDTT.

A fake DNS response packet may be created at step 556. The fake DNS response is generated according to the DNS protocol and is sent to the requester application via the shared memory. The fake DNS response includes the fake domain IP address as the payload of the DNS response packet. The destination address of the fake DNS response is the IP address of the UE 110*a-c* (FIG. 1) and the source IP address of the DNS response is the IP address of the DNS server that was written in the request. In an alternate embodiment of the present invention, the TTL field of the DNS response may be modified. Meta data that is associated with this response is created and may be stored in the shared memory. One of the flags in the meta data, which indicates the direction of the packets (e.g. coming from or to PIM 245), may be set to earmark this as an inbound packet, thereby informing the DNS-NEM 240 to transfer the packet to the TCP module 230 and from there via socket API 220 (FIG. 2) to the appropriate application 210*a-c*. The pointer to the location of the DNS response and the associated meta data in the shared memory is then transferred at step 556 to the queue of DNS-NEM 240. After transferring the pointer to the packet, process 500*b* terminates at step 558 and the processing resources that have been allocated to process 500*b* are released.

Referring now to FIG. 5C, the exemplary process 500*c* is described. The process 500*c* is an exemplary task that may be issued or initiated at step 560 by the PIM 245 (FIG. 2) upon receiving, from the DNS-NEM 240, a pointer (step 536 in FIG. 5A) to an outbound packet with a fake destination IP address. Upon initiation at step 560, process 500*c* may process the header of the packet. Based on the IP addresses in the header, at step 562, a search of the CDTT may be invoked to find any entry that is associated with the connection. Once an entry is found, the first data packet field in the entry is analyzed at step 564 to determine whether the packet is a first packet of the connection.

If at step 564 it is determined that the packet is the first packet, then the domain name is retrieved at step 570 from the appropriate entry in the CDTT. The domain name is added to the first packet at step 572 as a piggyback and thereby creates the association of the first packet with the piggyback. If the length of the packet with the piggyback information exceeds the maximum length, then the domain name may be sent as a special message instead of as a piggybacked message. In an alternate embodiment of the present invention, the domain name may be sent in a separate packet prior to the first packet. Additional processing may be also be performed on the packet, including but not limited to, calculating the checksum bits of the packet with the piggyback. Furthermore, the field in the CDTT that is associated with the first packet is set and remains set as long as the connection exists. Then the association of the first data packet and the piggyback or the special message is stored in the shared memory. A decision is made step 574 whether the packet can be manipulated by MEqC. If determination is positive, then at step 576 a pointer to the location in the shared memory of the association of the first packet and the domain name is transferred to the queue of the DNS-NEM 240 and from there, via the MEq-NEM 250 (FIG. 2) to the MEqC 255. After transferring the pointer to the MEqC, process 500*c* terminates at step 579 and the processing resources that have been allocated to the process 500*c* are released.

In another exemplary embodiment of the present invention, the association may be transferred to the MEqC 255 (FIG. 2) via the shared memory 205. The MEqC 255 may use the CDTT to process the association.

If at step 574 the communication cannot be manipulated by MEqC 255, then at step 578 the association may be embedded in a DNS tunnel packet that connects the PIM 245 with the DFPM 340 (FIG. 3). In an alternate embodiment, the association may be embedded in a UDP packet that is targeted to the DFPM 340 or to the filter 330 (FIG. 3). A pointer to the embedded association packet is placed in the queue of the DNS-NEM 245 to be sent toward the LFN.

If at step 564 it is determined that the packet is not the first packet, then a field in the meta data that is associated with the direction of packet is set at step 566 to indicate that the packet is ah outbound packet aimed to the link layer 270 (FIG. 2). At this point the relevant entry in the CDTT may be checked in order to determine whether the packet can be manipulated. If the packet cannot be manipulated, the fake address can be replaced with the real one. If the packet can be manipulated the fake address remains as is. Then the packet and the meta data are stored in the shared memory and a pointer to the packet and the meta data is transferred to the queue of the DNS-NEM task 500*a* (FIG. 5A). After transferring the pointer, process 500*c* terminates at step 579 and the processing resources that have been allocated to the task 500*c* are released.

Figure 5D:
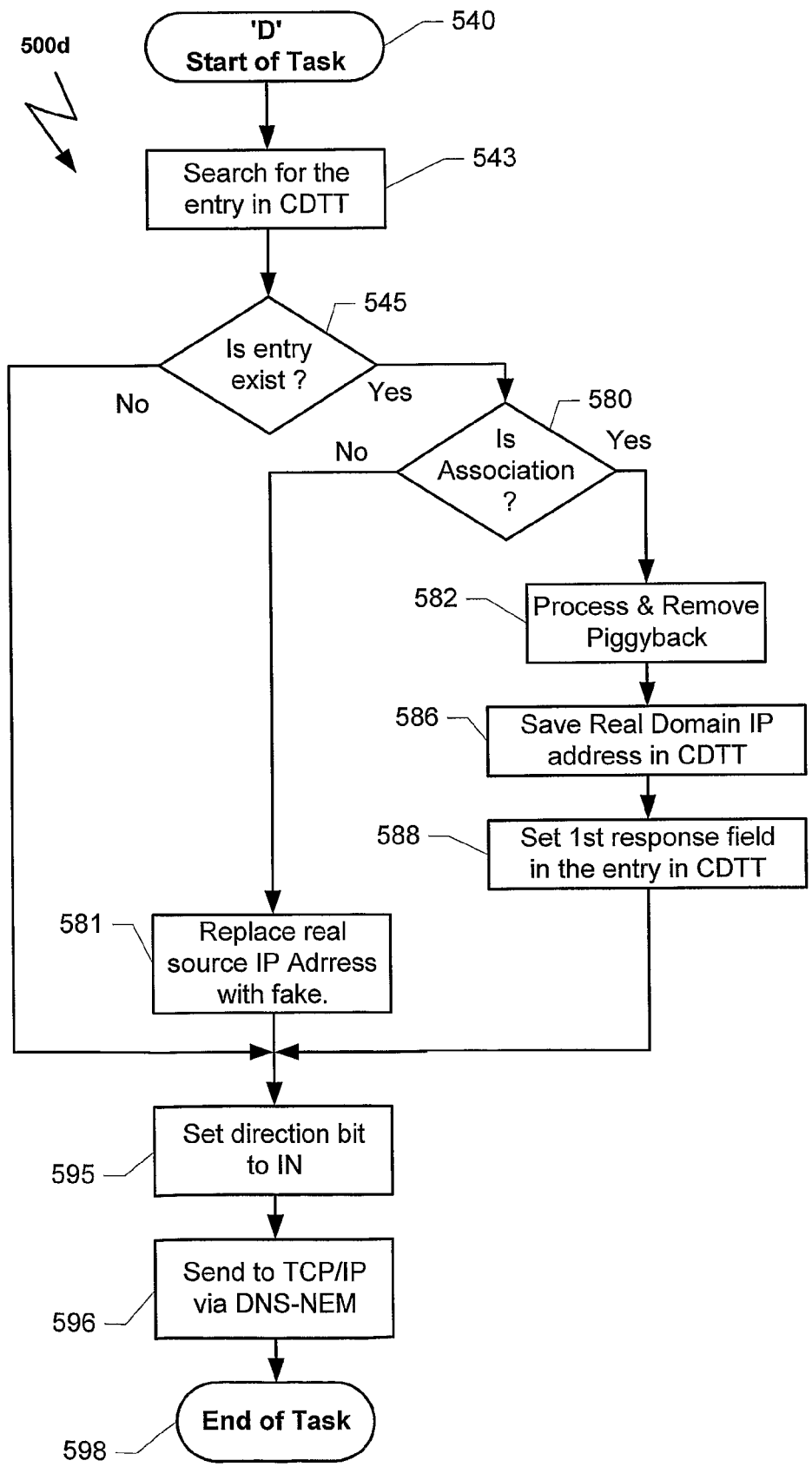
FIG. 5d illustrates a flowchart with relevant step of an exemplary method that may be used at the user equipment in order to route inbound packets.

FIG. 5D illustrates an exemplary process 500*d* that may be created by the PIM 245 (FIG. 2) upon receiving, from the DNS-NEM (step 526 in FIG. 5A), a pointer to a packet that just arrived from LFN 120 (FIG. 1) via the link layer 270 (FIG. 2) and the NEM-MEq 250. The packet can be an association packet of a connection that cannot be manipulated by the MEqC 255, or a packet with a real source IP address. Those packets may be treated by the PIM 245. Once the process 500*d* is initiated or invoked, at step 540 the packet and the associated meta data are read from the shared memory. Based on the IP addresses within the packet, the CDTT is searched at step 543 for an entry, which is associated with the connection to which the packet belongs. At step 545 a decision is made whether an entry was found.

If at step 545 an entry was not found, then the meta data that is associated with the packet is modified at step 595 to indicate that the packet can be transferred to the TCP/IP module 230 (FIG. 2) via the DNS-NEM 240. The packet and the meta data are stored in the shared memory and a pointer to their location is transferred at step 596 to the queue of the DNS-NEM module. After transferring the pointer, process 500*d* terminates at step 598 and the processing resources that have been allocated to the process 500*d* are released.

Returning to step 545, if an entry was found, then a decision is made at step 580 whether or not the packet is an association of a first response packet with the real domain IP address. This decision can be based on the IP addresses and the type of the packet in which the association was embedded. For example, the association may be embedded in a DNS tunnel packet that is transferred between the PIM 245 (FIG. 2) and the DFPM 340 (FIG. 3). Alternatively, the association may be embedded in a UDP packet that was sent from the DFPM 340 to the PIM 245. If at step 580 it is determined that the packet is an association of the first response packet, then the piggyback information is removed from the packet and processed at step 582. The real IP address is retrieved from the piggyback information and is then saved at step 586 in the "real IP address field" of the entry in the CDTT found in step 543. At step 588, the "first response field" in the associated entry is set to indicate that the first response was received and remains set as long as the connection exists. Furthermore, an indication that the connection cannot be manipulated is set in an appropriate field in the associated entry in the CDTT. Process 500*d* continues at step 595 where the meta data that is associated with the response packet is modified to indicate that the direction of the packet is inbound, thereby informing the DNS-NEM 240 to transfer the packet to the TCP module 230 and from there via socket API 220 (FIG. 2) to the appropriate application 210*a-c*. Then the pointer to the location of the response packet and the associated meta data in the shared memory, is transferred at step 596 to the queue of the DNS-NEM 240. After transferring the pointer of the packet, process 500*d* terminates at step 598 and the processing resources that have been allocated to the process 500*d* are released.

Returning now to step 580, if it is determined that there is no association, then the fake address, which is written in the associated entry in CDTT, is retrieved. The retrieved fake IP address at step 581 is placed into the packet rather than the real source IP address. Process 500d then continues at step 595. Replacing the real IP address with the fake address and vice versa requires additional processing of the packet according to the communication protocol taking into consideration the differences of the address. For example, new checksum calculations have to be performed.

In an alternate exemplary embodiment of the present invention in which the DNS-NEM 240 and the PIM 245 may be implemented by a single module, processes 500a-d may be executed as a single task. For example, step 534 (FIG. 5A) can be modified to continue directly to method 500b step 551 (FIG. 5B) instead of initiating a new task 550 (FIG. 5b). As such, step 556 in process 500b (FIG. 5b) may be modified to return to step 510 (point 'A' in FIG. 5A) instead of terminating the task (step 558 FIG. 5B). In a similar manner, the set of steps (536, 562, 579) and (526, 543, 598) in figures (5a, 5b, and 5c) respectively may be modified.

In another exemplary embodiment of the present invention, the PIM 245 may have a queue in which pointers are placed by process 500a (DNS-NEM 240). The pointers identify locations in the shared memory of the different packets and their associated meta data. Process 500a may be modified in away that steps 526, 534 and 536 may add meta data to each packet to indicate the history of the packet, and which process (500b or 500c or 500d) is needed for further processing of the packet. The PIM 245 may include a dispatcher module that checks the PIM's queue in a loop looking for the next pointer in the queue. The next pointer is then retrieved, as well as its associated packet and the associated meta data. Based on the meta data, a decision is made as to which type of process (500b, 500c or 500d) to create. Then the pointer is transferred to the created task and the dispatcher rechecks the queue for the next pointer.

Figure 5E:
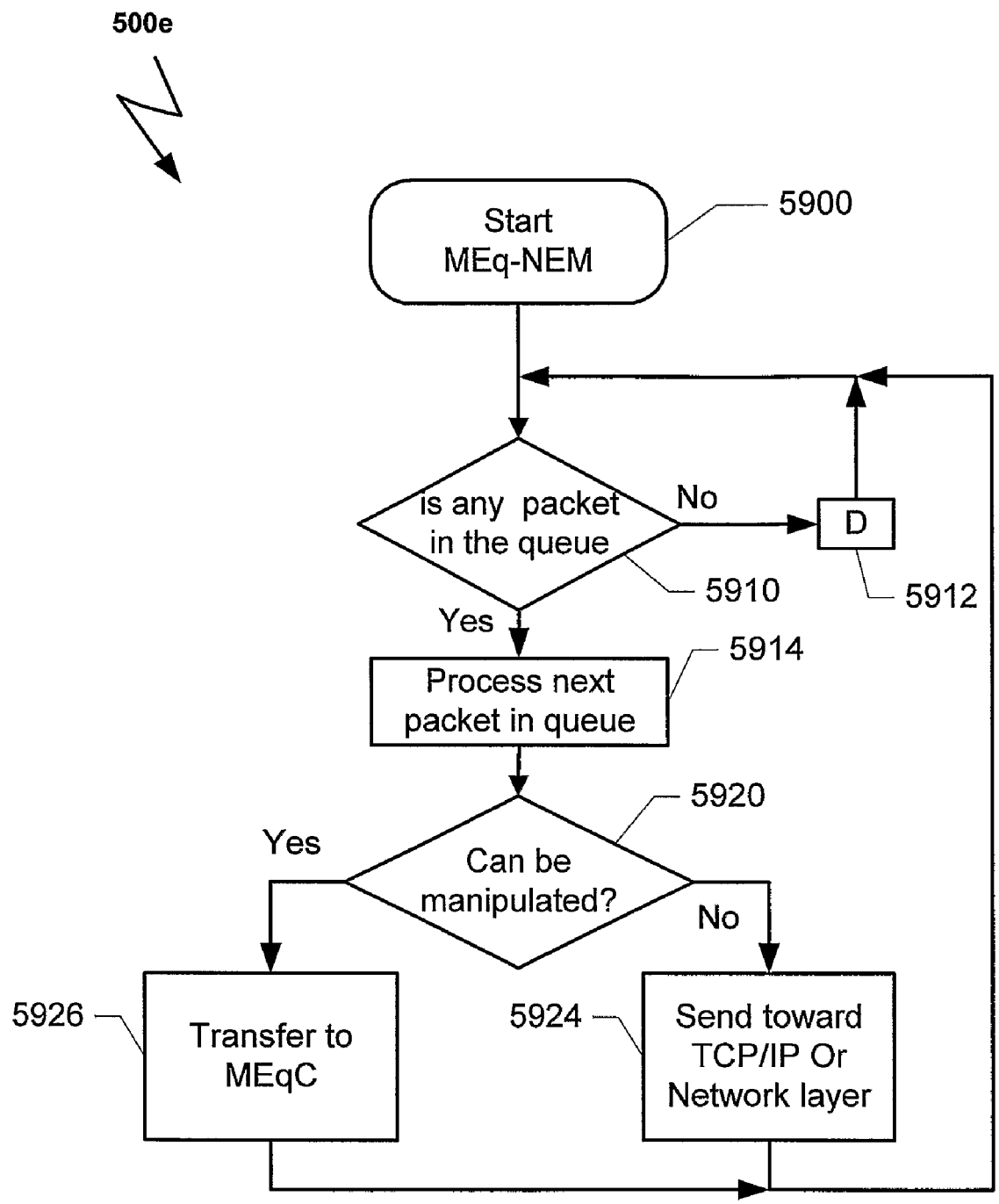
FIG. 5e illustrates a flowchart with relevant step of an exemplary method that may be used at the user equipment in order to route the packets to/from MEqC module.

FIG. 5E is a flowchart illustrating relevant steps of an exemplary process 500e that may be used by the MEq-NEM 250 (FIG. 2) to route packets to/from the MEqC module 255. After the power-on cycle, process 500e may be initiated at step 5900 and continues in a loop as long as client 200 (FIG. 2) is active. At step 5910 a queue, which is associated with the MEq-NEM 250, is checked and a decision is made as to whether a pointer to a packet exists in the queue. If the queue is empty, process 500e may wait at step 5912 for a period 'D' and then recheck the queue. Period 'D' can be in the range of few microseconds to few milliseconds. If at step 5910 a pointer is found, then based on the pointer, the packet with its associated meta data may be retrieved at step 5914 from the shared memory 205 and the pointer to the packet is released from the queue. The packet and the meta data are processed and based on the type of the packet, the destination and source addresses as well as relevant flags, a decision is made a step 5920 as to whether the packet can be manipulated by the MEqC 255.

If at step 592 it is determined that the packet can be manipulated, then the meta data that is associated with the packet, if any, may be updated to indicate the direction of the data flow. The packet with the updated meta data is then stored in the shared memory 205 and the pointer is transferred at step 5926 to the MEqC 255. Then process 500e returns to step 5910 to examine the queue for the next pointer.

Exemplary packets that can be transferred to the MEqC 255 are inbound packets, which come over the LFN 120a-c in a MEq tunnel and are directed to the MEqC. The inbound packets are reconstructed by the MEqC 255 and the meta data is update to inform the MEq-NEM 250 that the packet is an inbound packet that can be sent toward the appropriate application 210a-c via PIM-NEM, TCP module and the socket module.

Other packets that can be transferred to the MEqC can be outbound packets. In the exemplary embodiment of client 200, those outbound packets have a fake destination IP address. Exemplary outbound packets that are routed toward the MEqC are packets, which are constructed according to the TCP/IP requirements while the MEqC 255 is adapted to manipulate TCP/IP packets. In the MEqC, the packet can be manipulated and converted into an MEq tunnel packet, the meta data can be implemented to indicate that the tunnel packet can be transferred to the link layer 270 (FIG. 2) and the pointer to the tunnel packet is placed in the queue of MEq-NEM 250.

In an alternate embodiment of the present invention, if the packet is an association of a first packet, then a field in the tunnel packet may be set to inform the filter module 330 that it is an association and therefore it has to be transferred to the DFPM 340 (FIG. 3).

Returning now to step 5920, if the packet cannot be manipulated by the MEqC 255, then the packet is transferred to the next layer. If the packet is an inbound packet, then the next layer is the PIM 240. If the packet is an outbound packet, then the next layer is the link layer 270. Packets that cannot be manipulated by the MEqC 255 can be outbound MEq tunnel packets coming from the MEqC 255; or inbound packets coming from the MEqC 255 toward an application 210a-c; or inbound/outbound packets that cannot be manipulated. For example UDP/IP packets if the MEqC is unable to manipulate UDP/IP packets.

Figure 6:
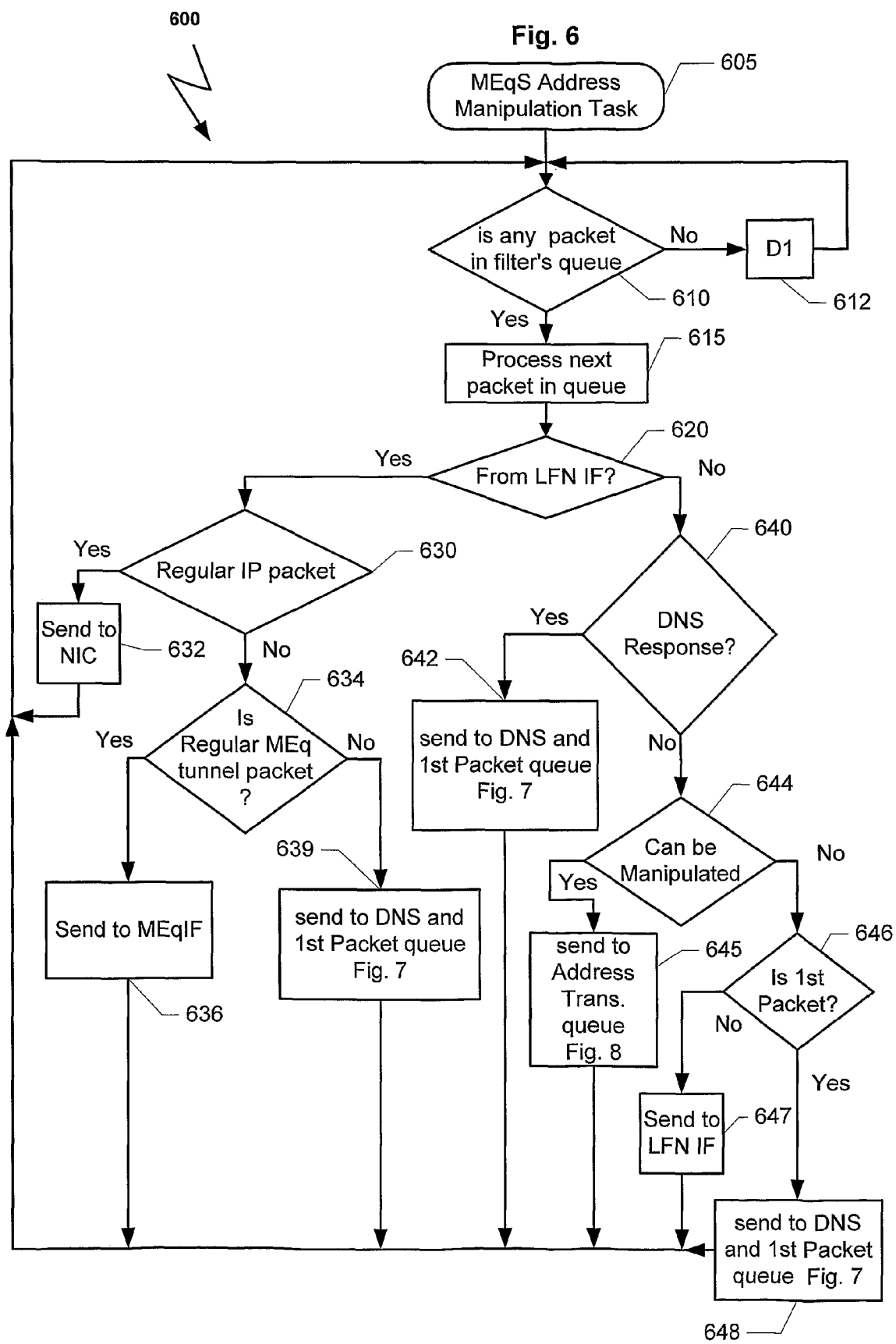
FIG. 6 illustrates a flowchart with relevant steps of exemplary method that may be used at a MEqS in order to route the packets to and from the different modules of the MEqS.

FIG. 6 illustrates an exemplary flowchart with relevant steps of exemplary process 600 that may be used by a filter module 330 (FIG. 3) at an MEqS 134 (FIG. 1) to route the appropriate packets to and from the different modules of the MEqS address manipulation module 302 (FIG. 3). Process 600 may run in a loop as long as the MEqS 134 is active. During a power-on cycle processing is invoked at step 605 where the MEqS address manipulation module 302 (FIG. 3) is reset, the SDTT is cleared or initialized, the different queues in the shared memory 380 (FIG. 3) are cleared, and each module is informed regarding the location of the different queues in the shared memory as well as the fields and the location of the different flags and status that may be added during the process of the packet. The flags and status may be added as meta data to the packet and be stored in the shared memory in association with the packet. The flags and status may indicate the history of the packet as well as future actions that are needed for processing of the packet. In addition the flags and status may point the direction that the packet is flowing (inbound or outbound), the next internal modules to which the packet is targeted, etc.

After the power-on cycle 605 is completed, at step 610 process 600 may check whether a pointer to a packet exists in a queue that is associated with the filter 330 (FIG. 3). If the queue is empty, process 600 may wait at step 612 for a period 'D1' And then recheck the queue. Period 'D1' can be in the range of few microseconds to few milliseconds. If at step 610 a pointer is found in the queue, then based on the pointer, the packet with its associated meta data may be retrieved at step 615 from the shared memory 380 and the pointer to the packet is released from the queue. Pointers may be placed in the queue by the different modules including, but not limited to the LFN IF 320 or NIM 310. Before forwarding the packet to the shared memory 380 and placing the pointer to the queue, a module may add meta data to the packet. Returning now to step 615, in which the packet and the meta data are processed and based on the type of the packet, the destination and source IP addresses as well as relevant flags (which are depicted in the following paragraphs), subsequently a decision is made at step 620 whether the direction of the packet is from the LFN 120 (FIG. 1) or is targeted to the LFN.

If at step 620 the direction of the packet is from the LFN, then a decision is made step 630 whether the packet is a regular IP packet with a real destination IP address in network 140 (FIG. 1). If the packet is not a regular IP packet, processing continues at step 634. If it is a regular packet, then at step 632 a pointer to the packet is placed in the queue of the NIM 310. The meta data, which is associated with the packet, may be modified to inform the NIM 310 to transfer the packet toward the network 140 (FIG. 1) to its destination. The NIM 310 may be configured to release the entry in the shared memory that is associated with the packet and its meta. Process 600 then returns to step 610 to look for the next pointer in the queue.

At step 634, the non regular IP packet is examined to determine if the packet is a regular MEq tunnel packet. This decision may be made by searching the SDTT looking for an entry that is associated with the connection. Searching the SDTT may be based on the addresses and the port numbers that are associated with the packet. If an entry was found and the first request packet field or flag has been already set to the ON or true condition, indicating that the packet is a regular MEq packet and not an association of a first request packet, then a pointer to the packet and its meta data is placed in the queue of the MEq IF 360 (FIG. 3) at step 636 and process 600 returns to step 610 waiting for the next pointer in the queue. The MEq IF 360 (FIG. 3) may be configured to retrieve the packet and its meta data from the shared memory 380, to release the relevant entry in the shared memory, process the packet according to the rules of the MEq application and transfer the packet to the relevant MEAMT 370 (FIG. 3).

In an alternate embodiment of the present invention, a dedicated field in the MEq tunnel packet may be used to mark the MEq tunnel packet of an association versus a regular MEq tunnel packet. In another exemplary embodiment of the present invention an association of first packet with the piggyback information may be sent from the PIM 245 (FIG. 2) to the DFPM 340 (FIG. 3) via a DNS tunnel or embedded in a UDP packet.

If at step 634 the packet is not a regular MEq tunnel packet, which means that it is an association of a first request for data and a piggyback with a domain name, then the meta data is updated at step 639 accordingly and a pointer to the packet and its meta data is placed in the queue of the 'DNS and first packet module' 340 (FIG. 3). Then process 600 returns to step 610 to look for the next pointer in the queue.

Returning now to step 620, if the packet did not arrive from the LFN IF 320 (FIG. 3), which means that the packet is a response packet coming from a server via NIM 310 (FIG. 3), then a decision is made at step 640 whether the packet is a DNS response. If the packet is a DNS response, then the meta data is updated at step 642 to indicate that the packet is a DNS response and a pointer to the packet and its meta data is placed in the queue of the 'DNS and first packet module' 340 (FIG. 3). Process 600 then returns to step 610 looking for the next pointer in the queue.

If the packet is not a DNS response, which means that the packet is a response packet coming from the web, then a decision is made at step 644 whether the packet can be manipulated by the MEAM 305 (FIG. 3). The decision can be based on the capabilities of the MEAM 305 and the type of the packet. For example, a certain MEAM 305 may manipulate only TCP/IP packets. Therefore, if the packet is a TCP/IP packet then process 600 may proceed to step 645, otherwise process 600 may proceed to step 646. If at step 644 it is determined that the packet can be manipulated, then the meta data is updated at step 645 to indicate that the packet is a response packet coming from a web server and needs to be transferred to the MEq IF 360 (FIG. 3) for manipulation. In the exemplary embodiment of the present invention the communication between the application 210a-c (FIG. 2) and the MEAMT 370 carries fake IP addresses. Therefore, the real source IP address has to be replaced, then a pointer to the packet and its meta data is placed in the queue of the ATM 350 (F. 3) at step 645. After placing the pointer, process 600 returns to step 610 looking for the next pointer in the queue.

If at step 644 it is determined that the packet cannot be manipulated, then a decision is made at step 646 whether the packet is a first response packet of a connection. The decision may be made by searching the SDTT looking for an entry that is associated with the connection. Searching the SDTT may be based on the addresses and the port numbers that are associated with the packet. If an entry was not found or an entry was found and the first response packet field is on or true, indicating that the packet is not a first response packet, then the meta data, which is associated with the packet, may be updated to indicate that the packet is in the direction of the LFN 120 (FIG. 1) and a pointer to the packet and its meta data is placed in the queue of the LFN IF 320 (FIG. 3) at step 647. Process 600 then returns to step 610 looking for the next pointer in the queue. The LFN IF 320 (FIG. 3) may be configured to retrieve the packet and its meta from the shared memory 380, to release the relevant entry in the shared memory, process the packet according to the rules of the LFN and transfer the packet to the relevant LFN 120a-c (FIG. 1).

If at step 646 an entry in the SDTT was found and the appropriate field, which indicates that the packet is a first response packet from a server is off, then the meta data is updated at step 648 to indicate that the packet is a first response packet. The field in the SDTT is also updated to indicate that the first response packet has been received. Then, a pointer to the packet and its meta data is placed in the queue of the 'DNS and first packet module' 340 (FIG. 3) at step 648 and process 600 returns to step 610 looking for the next pointer.

Figure 7:
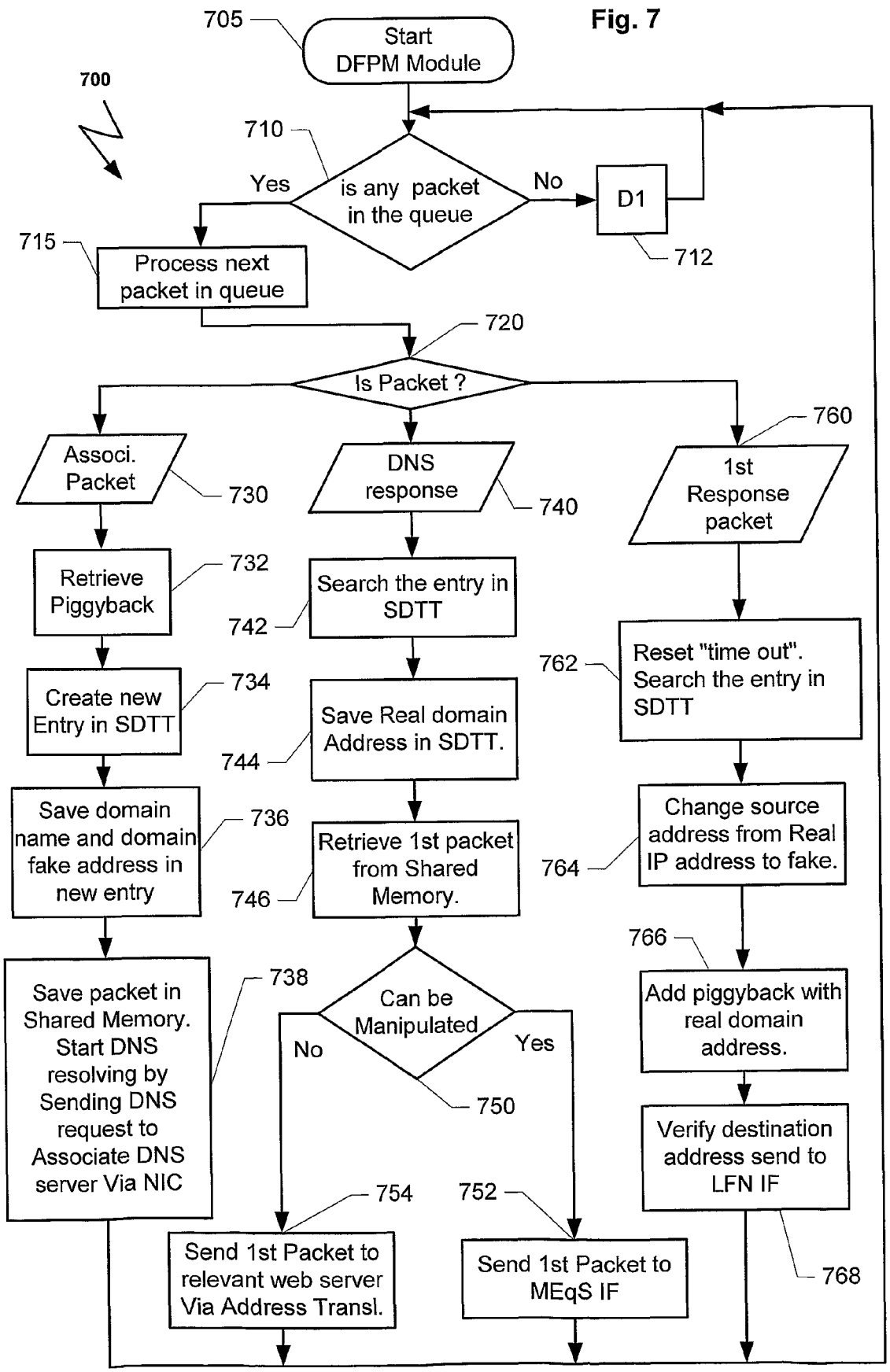
FIG. 7 illustrates a flowchart with relevant steps of exemplary method that may be used at a MEqS in order to handle DNS request and responses as well as the manipulation of the 1st packet.

FIG. 7 is a flowchart diagram illustrating the relevant steps of exemplary process 700 that may be used by a 'DNS and first Packet Module' (DFPM) 340 (FIG. 3) at an MEqS 134 (FIG. 1) to handle DNS request and responses as well as the manipulation of the first packet. Process 700 may run in a loop as long as the MEqS 134 is active. During a power-on cycle 705, the MEqS address manipulation module 302 (FIG. 3) is reset, the SDTT may be initialized or cleared, the different queues in the shared memory 380 (FIG. 3) may be cleared or emptied, and each module may be informed with the location of the different queues in the shared memory as well as the fields and the meaning of the different flags and status that may be added during the process of the packet. The flags and status may be added as meta data to the packet and then stored in the shared memory in association with the packet. The flags and status may indicate the history of the packet as well as future actions that are needed. In addition the flags and status may identify the direction of the packet, as well as the next internal modules to which the packet is targeted, etc.

After the power-on cycle 705 is complete, process 700 may check at step 710 whether a pointer to a packet exists in a queue that is associated with the DFPM 340 (FIG. 3). If the queue is empty, process 700 may wait at step 712 for a period 'D1' and then recheck the queue. Period 'D1' can be in the range of few microseconds to few milliseconds. If at step 710 a pointer is found in the queue, then based on the pointer, the packet with its associated meta data may be retrieved and processed at step 715 from the shared memory 380 and the pointer to the packet released from the queue. At step 720 a decision is made about the type of the packet. The meta data set by process 600 and may indicate whether the packet is an association of first request 730 coming from a remote client, or a DNS response 740 coming from a DNS server, or a first response 760 coming from a web server.

If the packet is an association of first request packet with a domain name 730 coming from a remote client, then the piggyback that is associated with the packet is retrieved at step 732. The association may be embedded in an MEq tunnel using one or more packets, in a DNS tunnel that is sent between the PIM 245 and the DFPM 340, or in a UDP using one or more packets that were sent from the PIM 245 to the DFPM 340.

After retrieving the piggyback information and the domain name at step 732, a new entry is created at step 734 in the SDTT that will associate the new connection with the new domain name. Then, the domain name and the selected fake domain IP address, as well as the source IP address of the packet, are stored at step 736 in the associated entry in SDTT. In an alternate embodiment of the present invention, the SDTT may include additional fields that may be used during the duration of the connection. The different fields may include but are not limited to: a field for indicating whether a first packet that is associated with the new connection has been received, a field for indicating whether a first response that is associated with the new connection has been received and transferred, etc. In such an embodiment, the first packet field is set and the first response field in the new entry is reset. The entry in the SDTT is released when the connection is terminated.

Other exemplary embodiments of the present invention may release the entry at the end of a certain period after the termination of the connection. The period may be related to the period of time that a common cache exists. In an alternate embodiment, the period can be a fixed time, e.g. 12, 24, 48 hours, etc. Other embodiments may be configured to release an entry from the queue upon receiving a command from the remote client.

After creating the associated entry in the SDTT, at step 738 the first packet without the piggyback is saved in the shared memory 380, and a DNS request with the IP address is prepared and is saved in the shared memory 380 (FIG. 3). A pointer to the location of the DNS request is placed in the queue of NIM 310 (FIG. 3) and process 700 returns to step 710 looking for the next pointer in the queue of DFPM 340 (FIG. 3). In parallel, the pointer in the queue of NIM 310 is retrieved by the NIM 310 (FIG. 3) and is processed and sent by the NIM 310 (FIG. 3) to the local DNS server 136 (FIG. 1). After retrieving the DNS request from the shared memory 380 (FIG. 3) the location of the DNS request in the shared memory is released.

In an alternate embodiment of the present invention, in which a DNS cache is used, at step 738 of process 700 the DNS cache may be searched before initiating the DNS request.

After placing the pointer in the queue of the NIM 310, a timer 'Timer 1' may be set for a certain period of time, such as a few seconds. The timer may be reset upon receiving a DNS response from the DNS server. If the timer 'Timer 1' is not reset then an error message may be sent to the client to indicate that establishment of the connection was unsuccessful. The PIM 245, upon receiving the error message may inform the application 210a-c that the connection has been terminated. Both ends may reset the appropriate entries in the shared memories as well as the CDTT and the SDTT.

If at step 740 the packet is a DNS response, then the associated entry in the SDTT is searched at step 742. The entry may be searched based on the domain name. The timer 'Timer 1' that is associated with the connection is reset. The real domain IP address is saved in the appropriate field in the associated entry at step 744. The first request packet that was saved at step 738 is retrieved at step 746 from the shared memory and a decision is made at step 750 whether the packet can be manipulated by the MEAM 305.

In an alternate embodiment of the present invention, in which a DNS cache is used, at step 744 of process 700 the domain name and its IP address may also be saved in the DNS cache.

If at step 750 it is determined that the packet can be manipulated, then a pointer to the location of the packet (that has a fake domain IP address) is placed in the queue of the MEq IF 360 (FIG. 3) at step 752 and process 700 returns to step 710 looking for the next pointer in the queue of DFPM 340 (FIG. 3). The MEAM 305 and the MEqC manipulate packets with the fake domain IP address.

If at step 750 it is determined that the packet cannot be manipulated, then a pointer to the location of the packet in the shared memory 380 is transferred at step 754 to a queue that is associated with the ATM 350 (FIG. 5), and a timer "Timer 2" that is associated with the connection is set—in an exemplary embodiment the timer is set for a few seconds. 'Timer 2' can be reset upon receiving a first response from the web server. If 'Timer 2' terminates before receiving the first response, then the real IP address can be sent as a special message to the client 200 (FIG. 2). Upon receiving the real domain IP address in the special message, the PIM 245 (FIG. 2) may proceed and send the next packets that came from the application to their destination. The option of 'Timer 2' is useful when the communication between the application 210a-c (FIG. 2) and the web server is connectionless, including but not limited to a connection that is using UDP/IP. After placing the pointer in the queue 754 of the ATM, process 700 returns to step 710 looking for the next pointer in the queue of the DFPM 340 (FIG. 3).

If at step 720 the packet is the first response packet 760 of a connection that cannot be manipulated by the MEq, then at step 762 'Timer 2' is reset, and the associated entry in the SDTT is searched based on the IP addresses. The real source IP address is replaced at step 764 by the fake IP address that is stored in the associated entry. A piggyback or a special message may be added with the real domain IP address. Then the association of the first response with the real domain IP address is embedded in a DNS tunnel packet or in a UDP/IP packet that is targeted toward the PIM 245 (FIG. 2). The enveloped packet is placed in the shared memory with associated meta data. The meta data may be modified to indicate that the packet is an association of the first response with a piggyback that cannot be manipulated by the MEq. A pointer to the location in the shared memory is transferred to the queue of LFN IF 320 (FIG. 3) at step 768. The process 700 then returns to step 710 looking for the next pointer.

The LFN IF 320, upon retrieving the association of the first packet with the piggyback and the associated meta data may send it via the LFN 120 to the PIM 245.

FIG. 8 is a flow diagram illustrating the relevant steps of an exemplary process 800 that may be used by an exemplary address translator module (ATM) 350 (FIG. 3) at an MEqS 134 (FIG. 1) to translate fake domain IP addresses to real IP addresses of packets going toward network 140 (FIG. 1) and in the other direction to translate real domain IP address of packets coming from network 140 (FIG. 1) to fake domain IP address. Process 800 may run in a loop as long as the MEqS 134 is active. During a power-on cycle at step 805, the MEqS address manipulation module 302 (FIG. 3) is reset, the SDTT may be reset or initialized, the different queues in the shared memory 380 (FIG. 3) may be cleared or emptied, and each module may be informed with the location of the different queues in the shared memory as well as the fields and the meaning of the different flags and status that may be added during the process of the packet. The flags and status may be added as meta data to the packet and be stored in the shared memory in association with the packet. The flags and status may indicate the history of the packet as well as future actions that are needed. In addition, the flags and status may indicate the direction of flow of the packet and the next internal modules to which the packet is targeted, etc.

After power-on cycle of step 805, the process 800 may check at step 810 whether a pointer to a packet exists in a queue that is associated with ATM 350 (FIG. 3). If the queue is empty, process 800 may wait at step 812 for a period 'D1' and then recheck the queue. The period 'D1' can be in the range of few microseconds to few milliseconds. If at step 810 a pointer is found in the queue, then based on the pointer the packet with its associated meta data may be retrieved from the shared memory 380 and processed at step 815 and the pointer to the packet released from the queue. Based on the IP addresses, an entry in the SDTT that is associated with the relevant connection is searched. In parallel, or at the end of the search, at step 820 a decision is made whether the packet arrived from the MEq IF 360 (FIG. 3). The decision may be based on the meta data that is associated with the packet.

If at step 820 it is determined that the packet arrived from the MEq IF 360, then the result of the search for an entry in the SDTT is checked and a decision is made at step 830 whether an entry was found. If at step 830 an entry was not found, which means that the destination IP address is a real one, then the meta data is updated to indicate that the packet can be sent to the network 140 and a pointer to the packet is placed in the queue of NIM 310 (FIG. 3) at step 854. Such a packet may be initiated by a client of the MEq server that its MEqC does not have the option of accelerating DNS requests according to the exemplary embodiments of the present invention. Later, based on the pointer, a relevant packet is retrieved by the NIM 310 (FIG. 3) and is processed and sent by the NIM 310 (FIG. 3) to the network 140 via router 136 (FIG. 1). After retrieving the packet from the shared memory 380 (FIG. 3) the location of the packet in the shared memory is released by NIM 310.

If at step 830 an entry in SDTT that is associated with the connection is found, then the fake destination domain IP address is replaced at step 852 with the real one, which is retrieved from the associated entry in the SDTT. Replacing the fake IP address with the real address and vice versa requires additional processing of the packet according to the communication protocol taking into consideration the differences of the address. For example, new checksum calculations may have to be performed. The meta data is updated to indicate that the packet can be sent to the network 140 and a pointer to the packet is placed in the queue of NIM 310 (FIG. 3) at step 854.

Returning now to step 820, if the meta data indicates that the packet has not arrived from the MEq IF 360, then the meta data is checked and a decision is made at step 840 as to whether the packet has arrived from the DFPM 340 (FIG. 3). If the packet did arrive from the DFPM 340, the packet is a first request packet of a connection that cannot be manipulated by the MEAM 305 (FIG. 3). The packet has a fake destination IP address. More information of such a packet is disclosed above in conjunction with the description of FIG. 7, more specifically, step 754 of process 700. Process 800 continues at step 852 by replacing the fake destination IP address before being sent to the network 140 via NIM 310 (FIG. 3) at step 854.

If at step 840 the packet has not arrived from the DFPM 340 (FIG. 3), which means that the packet arrived from a web server and can be manipulated by the MEAM 370, then the result of the search conducted in step 815 for an entry in SDTT are checked and a decision is made at step 842 whether an entry was found in the SDTT. If at step 842 an entry was not found, the connection belongs to a client that does not include an embodiment of the present invention. In this situation, the meta data is updated to indicate that the packet can be sent to the MEq IF 360 (FIG. 3) and a pointer to the packet is placed in the queue of MEq IF 360 (FIG. 3) at step 848.

If at step 842 it is determined that there is an entry in the SDTT that is associated with the connection, then the real source domain IP address is replaced at step 844 with the fake one, which is retrieved from the associated entry in the SDTT. Replacing the real domain IP address with the fake address and vice versa requires additional processing of the packet according to the communication protocol taking into consideration the differences of the address. For example, new checksum calculations have to be determined. The meta data is updated to indicate that the direction of the packet is toward the LFN 120*a-c* via MEAM 305 and a pointer to the packet is placed in the queue of MEq IF 360 (FIG. 3) at step 848.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. A module may be a stack of software tasks that perform the functionality of the module.

Overall, this invention will improve the communication over the network, such as but not limited to, Long Fat Networks of transportation. Exemplary embodiments of the present invention optimize DNS transportation over a LFN. Furthermore exemplary embodiments the present invention discloses a method and an apparatus that reduces the latency that occurs due to DNS query over a LFN connection. Exemplary embodiments of the present invention may add the DNS request to a 1st packet and let the other side of the LFN perform the DNS request.

In the description and claims of the present application, each of the verbs, "comprise"; "include" and "have", and conjugates thereof, are used to indicate that the task or tasks of the verb are not necessarily a complete listing of members, components, elements, or parts of the subject or subjects of the verb.

The present invention may be established by any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

The scope of the invention is limited only by the following claims.

What is claimed is:

1. A method that optimizes communication between one or more remote clients and a Domain Name Server (DNS), wherein at least a portion of the communication is conducted over a long fat network (LFN) that has a first end in communication with a remote manipulator and a second end in communication with a central operator zone that is operable, via a local manipulator, to bridge said second end to an Internet Protocol (IP) network, the method comprising the actions of:
   at the remote client:
   a. routing via the remote manipulator, packets coming from an application to the LFN and from the LFN to the application;
   b. for each packet received by the remote manipulator, identifying the type of packet and, if the packet is:
      i. a DNS request requesting a real IP address of a domain name to which the application requests to established a connection, wherein the destination of the DNS request is a DNS server and the DNS request having a domain name of the requested domain, then responding by:
         sending, to the application that initiated the request, a DNS response having a fake domain IP address instead of the real IP address of the requested domain; and
         storing the domain name and the fake domain IP address in a client DNS translating table (CDTT) in an associated entry;
      ii. a first packet having a data payload and targeted at a fake destination domain IP address, then responding by:
         associating the domain name with the first packet targeted to the fake address and having a data payload; and
         sending the associated first packet targeted to the fake address with the associated domain name to the local manipulator at the central operator;
      iii. an association of a first response packet having a fake source domain IP address with an addition of a real domain IP address coming from the local manipulator of the central operator, then storing the real domain IP address in an associated entry in the CDTT;
      iv. a packet coming from the LFN toward an application and having a real domain IP address, then responding by:
         searching the CDTT for an associated entry;
         replacing the real domain IP address with a fake domain IP address that is stored in the associated entry; and
         sending the packet with the fake domain IP address toward the application;
   at the central operator zone:
   c. routing, via the local manipulator, packets coming from an LFN to the IP network and packets coming from the IP network to the LFN;
   d. for each packet received at the local manipulator, identifying the packet type and, if the packet is:
      i. an association of a first packet having a fake destination domain IP address with a domain name, then responding by:
         storing the domain name and the fake domain IP address in an associated entry in a server DNS translating table (SDTT);
         storing the first packet having the fake domain IP address;
         creating a DNS request for the domain name; and
         sending the DNS request to a DNS server;
      ii. a DNS response having the domain name, then responding by:
         storing the real IP address in the entry in the SDTT that is associated with the domain name;
         retrieving the first packet that is associated with said entry;
         replacing the fake destination domain IP address associated with said first packet with the real IP address; and
         sending the packet with the real destination IP address toward the IP network;
      iii. a first packet having a real domain source IP address, then responding by:
         searching the SDTT for the entry associated with the first packet;
         replacing the real source domain IP address with the fake domain IP address that is associated with said entry;
         creating an association of the first packet with the real domain IP address; and
         sending the association of the first packet and the real domain IP address to the LFN;
   wherein associating, at the remote client, the domain name to the first packet having a data payload saves the transmission of the DNS request over the LFN; and
   wherein associating, at the local manipulator, the real domain IP address to the first packet saves the transmission of the DNS response over the LFN.

2. The method of claim 1, wherein the transmission between the remote manipulator and the local manipulator is accomplished via a tunnel.

3. The method of claim 1, wherein the association of the first packet with the domain name, and the association of the first response packet with the IP address, is accomplished by a sending a piggyback message.

4. The method of claim 1, wherein the association of the first packet with the domain name, and the association of the first response packet with the IP address, is accomplished by sending a special message.

5. The method of claim 1, wherein the association of the first packet with the domain name, and the association of the first response packet with the IP address, is accomplished by sending a prior packet.

6. The method of claim 1, wherein the step of replacing the real source IP address with the fake IP address, and replacing the fake source IP address with the real IP address, further comprises the step of recalculating the checksum information.

7. The method of claim 1, wherein the step of storing the domain name and the fake IP address at the remote client is done in an associated entry in a client domain translation table (CDTT).

8. The method of claim 7, wherein storing the real IP address at the remote client is done in the associated entry in the client domain translation table (CDTT).

9. The method of claim 1, wherein storing the domain name and the fake IP address at the central operator zone is done in an associated entry in a server domain translation table (SDTT).

10. The method of claim 1, wherein the step of storing the real IP address at the central operator zone is done in the associated entry in the server domain translation table (SDTT).

11. The method of claim 1, wherein the LFN is at least one type of network selected from a group consisting of: cellular, satellite, fiber optics cable, and wireless.

12. The method of claim 1, wherein at the central operator zone the real address and the domain name are saved in a DNS cache.

13. The method of claim 1, wherein the remote manipulator and the central manipulator optimize IP transportation between them.

* * * * *